US011669928B2

(12) United States Patent
Tracy et al.

(10) Patent No.: US 11,669,928 B2
(45) Date of Patent: Jun. 6, 2023

(54) FARE CLASSES WITH OBSCURED DEMAND

(71) Applicant: American Airlines, Inc., Fort Worth, TX (US)

(72) Inventors: Jonathan Tracy, Tempe, AZ (US); James Fox, Tempe, AZ (US); Julianne Bowles, Tempe, AZ (US); Michael Costello, Tempe, AZ (US); Daniel Muzich, Phoenix, AZ (US); Thomas Trenga, Mesa, AZ (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 196 days.

(21) Appl. No.: 16/600,003

(22) Filed: Oct. 11, 2019

(65) Prior Publication Data

US 2020/0051199 A1    Feb. 13, 2020

Related U.S. Application Data

(63) Continuation of application No. 15/654,240, filed on Jul. 19, 2017, now Pat. No. 10,489,871, which is a continuation of application No. 13/791,672, filed on Mar. 8, 2013, now Pat. No. 9,727,940.

(51) Int. Cl.
*G06Q 50/30* (2012.01)
*G06Q 30/0202* (2023.01)

(52) U.S. Cl.
CPC ......... *G06Q 50/30* (2013.01); *G06Q 30/0202* (2013.01)

(58) Field of Classification Search
CPC .................. G06Q 50/30; G06Q 30/0202

USPC .............................................. 705/5, 1.1, 7.11
See application file for complete search history.

(56) References Cited

U.S. PATENT DOCUMENTS

| 5,255,184 | A | 10/1993 | Hornick et al. |
| 5,270,921 | A | 12/1993 | Hornick |
| 5,832,454 | A | 11/1998 | Jafri et al. |
| 5,918,209 | A | 6/1999 | Campbell et al. |
| 5,929,842 | A | 7/1999 | Vertregt |
| 5,978,770 | A | 11/1999 | Waytena |
| 6,067,532 | A | 5/2000 | Gebb |
| 6,077,077 | A | 6/2000 | Geipe |

(Continued)

FOREIGN PATENT DOCUMENTS

| DE | 102011007822 | 10/2012 |
| WO | 9725684 | 7/1997 |

(Continued)

OTHER PUBLICATIONS

Obeng, K., and R. Sakano. "Airline Fare and Seat Management Strategies with Demand Dependency." Journal of air transport management 24 (2012): 42-48. Web. (Year: 2012).*

(Continued)

*Primary Examiner* — Akiba K Robinson
(74) *Attorney, Agent, or Firm* — Snell & Wilmer L.L.P.

(57) ABSTRACT

A computer-based system for unobscuring and/or unconstraining demand is disclosed. Via use of the system, actual airline seat bookings may be restated in an unobscured and/or unconstrained form, facilitating improved demand forecasts for subsequent seat bookings. In this manner, seat protects may be better allocated to align with actual demand, thus increasing revenue.

19 Claims, 11 Drawing Sheets

(56) References Cited

U.S. PATENT DOCUMENTS

| | | | |
|---|---|---|---|
| 6,085,164 | A | 7/2000 | Smith |
| 6,085,169 | A | 7/2000 | Walker et al. |
| 6,085,976 | A | 7/2000 | Sehr |
| 6,112,185 | A | 8/2000 | Walker et al. |
| 6,134,534 | A | 10/2000 | Walker et al. |
| 6,263,315 | B1 | 7/2001 | Talluri |
| 6,974,079 | B1 | 12/2005 | Strothmann |
| 7,085,726 | B1 | 8/2006 | Galperin et al. |
| 7,136,821 | B1 * | 11/2006 | Kohavi ............... G06Q 10/02 705/5 |
| 7,212,978 | B2 | 5/2007 | Kowal et al. |
| 7,263,496 | B1 | 8/2007 | Weigelt et al. |
| 7,418,409 | B1 | 8/2008 | Goel |
| 7,617,136 | B1 | 11/2009 | Lessing et al. |
| 7,848,940 | B1 | 12/2010 | Harniman et al. |
| 7,899,691 | B1 | 3/2011 | Lee |
| 8,190,457 | B1 | 5/2012 | Chandler et al. |
| 8,191,547 | B2 | 6/2012 | Pellegrino |
| 8,452,625 | B2 | 5/2013 | Maguire |
| 8,589,193 | B2 | 11/2013 | Maguire et al. |
| 2002/0059101 | A1 | 5/2002 | Ratliff |
| 2002/0065699 | A1 * | 5/2002 | Talluri ............ G06Q 10/06315 705/7.25 |
| 2002/0111935 | A1 | 8/2002 | Jones |
| 2002/0120492 | A1 | 8/2002 | Phillips et al. |
| 2002/0156659 | A1 | 10/2002 | Walker et al. |
| 2002/0161610 | A1 | 10/2002 | Walker et al. |
| 2002/0161689 | A1 | 10/2002 | Segal |
| 2002/0173978 | A1 | 11/2002 | Boies |
| 2002/0178034 | A1 | 11/2002 | Gardner |
| 2003/0036928 | A1 | 2/2003 | Kenigsberg |
| 2003/0065542 | A1 | 4/2003 | Gliozzi et al. |
| 2003/0115093 | A1 | 6/2003 | Lim |
| 2003/0191725 | A1 | 10/2003 | Ratliff |
| 2004/0158536 | A1 | 8/2004 | Kowl |
| 2004/0230472 | A1 * | 11/2004 | Venkat ............... G06Q 30/0202 705/7.31 |
| 2004/0249685 | A1 | 12/2004 | Douglas |
| 2005/0065838 | A1 | 3/2005 | Kalagnanm |
| 2005/0125266 | A1 | 6/2005 | Bramnick et al. |
| 2005/0177402 | A1 * | 8/2005 | Walker ............... G06Q 10/025 705/5 |
| 2005/0216317 | A1 | 9/2005 | Medellin et al. |
| 2005/0246208 | A1 | 11/2005 | Langerman |
| 2006/0195356 | A1 | 8/2006 | Nerenhausen et al. |
| 2006/0200370 | A1 | 9/2006 | Ratliff et al. |
| 2007/0143153 | A1 | 6/2007 | Ashby |
| 2007/0294117 | A1 | 12/2007 | Lopp |
| 2008/0027768 | A1 | 1/2008 | Thurlow |
| 2008/0052185 | A1 | 2/2008 | Goel |
| 2008/0071939 | A1 | 3/2008 | Tanaka |
| 2008/0133284 | A1 | 6/2008 | Birch |
| 2008/0183512 | A1 | 7/2008 | Benzinger |
| 2009/0024423 | A1 | 1/2009 | Hay |
| 2009/0030741 | A1 | 1/2009 | Veitch |
| 2009/0063219 | A1 | 3/2009 | Raufaste et al. |
| 2009/0088814 | A1 | 4/2009 | Good |
| 2009/0182588 | A1 | 7/2009 | Ashby |
| 2009/0216568 | A1 | 8/2009 | Raufaste |
| 2009/0234710 | A1 | 9/2009 | Belgaied |
| 2009/0287518 | A1 | 11/2009 | Marode et al. |
| 2010/0153143 | A1 | 6/2010 | Baggett |
| 2010/0250291 | A1 | 9/2010 | Walker et al. |
| 2011/0010205 | A1 | 1/2011 | Richards |
| 2011/0071886 | A1 | 3/2011 | Schnur |
| 2011/0145087 | A1 | 6/2011 | Daman |
| 2011/0153373 | A1 | 6/2011 | Dantzig |
| 2012/0035965 | A1 | 2/2012 | Maguire et al. |
| 2012/0078667 | A1 | 3/2012 | Denker |
| 2012/0271679 | A1 | 10/2012 | Schroder |
| 2012/0284064 | A1 | 11/2012 | Sussman et al. |
| 2012/0310706 | A1 * | 12/2012 | Nguyen ............... G06Q 30/06 705/7.31 |
| 2013/0024217 | A1 | 1/2013 | Pradignac et al. |
| 2013/0054279 | A1 | 2/2013 | Sharp et al. |
| 2013/0103434 | A1 | 4/2013 | Cazeaux |
| 2013/0103439 | A1 | 4/2013 | Vernitsky |
| 2013/0339070 | A1 | 12/2013 | Meghji |
| 2014/0039944 | A1 | 2/2014 | Humbert |
| 2014/0052750 | A1 | 2/2014 | Ciabrini |
| 2014/0067435 | A1 | 3/2014 | Hasnas |
| 2014/0074853 | A1 | 3/2014 | Nath |
| 2014/0089588 | A1 | 3/2014 | Redoutey |
| 2014/0108067 | A1 | 4/2014 | Gluhovsky |
| 2014/0136247 | A1 | 5/2014 | Bareges et al. |
| 2014/0257881 | A1 | 9/2014 | Tracy et al. |
| 2014/0278598 | A1 | 9/2014 | Padgen |
| 2014/0344023 | A1 | 11/2014 | Chiu et al. |
| 2015/0154511 | A1 | 6/2015 | Magnat |
| 2015/0324326 | A1 | 11/2015 | Chen |
| 2015/0371245 | A1 | 12/2015 | Bental et al. |
| 2016/0080216 | A1 | 3/2016 | Yu |
| 2016/0210564 | A1 | 7/2016 | Guillard |
| 2016/0210584 | A1 | 7/2016 | Guillard |
| 2016/0232532 | A1 | 8/2016 | Canis et al. |
| 2016/0350396 | A1 | 12/2016 | Blanc |
| 2017/0061333 | A1 | 3/2017 | Endres |
| 2017/0213159 | A1 | 7/2017 | Hartmans |
| 2022/0222692 | A1 | 7/2022 | Tracy |

FOREIGN PATENT DOCUMENTS

| | | |
|---|---|---|
| WO | 0191001 | 11/2001 |
| WO | 2005050410 | 6/2005 |

OTHER PUBLICATIONS

Office Action dated Sep. 26, 2012 in U.S. Appl. No. 13/352,757.
Office Action dated Oct. 9, 2012 in U.S. Appl. No. 13/352,667.
Office Action dated Mar. 27, 2013, 2013 in U.S. Appl. No. 13/352,628.
Office Action dated Apr. 8, 2013, 2013 in U.S. Appl. No. 13/348,417.
Requirement for Information dated Apr. 11, 2013 in U.S. Appl. No. 13/352,719.
Office Action dated Sep. 12, 2013 in U.S. Appl. No. 13/352,667.
Final Office Action dated Oct. 16, 2013 in U.S. Appl. No. 13/352,628.
Notice of Allowance dated Oct. 25, 2013 in U.S. Appl. No. 13/352,667.
Office Action dated Oct. 31, 2013 in U.S. Appl. No. 13/348,417.
Notice of Allowance dated Oct. 31, 2013 in U.S. Appl. No. 13/352,667.
Advisory Action dated Jan. 16, 2014 in U.S. Appl. No. 13/352,628.
Office Action dated May 9, 2014 in U.S. Appl. No. 13/352,719.
Office Action dated Jun. 9, 2014 in U.S. Appl. No. 13/348,417.
Final Office Action dated Jun. 18, 2014 in U.S. Appl. No. 13/352,719.
Office Action dated Aug. 5, 2014 in U.S. Appl. No. 13/352,719.
Final Office Action dated Sep. 8, 2014 in U.S. Appl. No. 13/352,719.
Office Action dated Oct. 9, 2014 in U.S. Appl. No. 13/348,417.
Final Office Action dated Oct. 22, 2014 in U.S. Appl. No. 13/348,417.
Advisory Action dated Jan. 2, 2015 in U.S. Appl. No. 13/348,417.
Office Action dated Feb. 13, 2015 in U.S. Appl. No. 13/352,628.
Final Office Action dated Mar. 12, 2015 in U.S. Appl. No. 13/352,628.
Advisory Action dated Apr. 3, 2015 in U.S. Appl. No. 13/352,628.
Office Action dated Mar. 23, 2015 in U.S. Appl. No. 14/038,278.
Office Action dated May 11, 2015 in U.S. Appl. No. 13/791,711.
Office Action dated Jun. 5, 2015 in U.S. Appl. No. 13/791,672.
Office Action dated Jun. 18, 2015 in U.S. Appl. No. 13/348,417.
Office Action dated Jun. 25, 2015 in U.S. Appl. No. 13/352,719.
Office Action dated Jul. 10, 2015 in U.S. Appl. No. 13/352,628.
Final Office Action dated Sep. 8, 2015 in U.S. Appl. No. 14/038,278.
Office Action dated Sep. 9, 2015 in U.S. Appl. No. 13/791,691.
Final Office Action dated Sep. 10, 2015 in U.S. Appl. No. 13/352,719.
Final Office Action dated Sep. 11, 2015 in U.S. Appl. No. 13/348,417.
Advisory Action dated Sep. 18, 2015 in U.S. Appl. No. 14/038,278.
Advisory Action dated Sep. 24, 2015 in U.S. Appl. No. 13/348,417.
Advisory Action dated Sep. 25, 2015 in U.S. Appl. No. 13/352,719.
Final Office Action dated Sep. 25, 2015 in U.S. Appl. No. 13/791,711.
Final Office Action dated Sep. 29, 2015 in U.S. Appl. No. 13/352,628.
Advisory Action dated Oct. 16, 2015 in U.S. Appl. No. 13/352,628.

(56) References Cited

OTHER PUBLICATIONS

Office Action dated Nov. 6, 2015 in U.S. Appl. No. 13/352,719.
Advisory Action dated Nov. 6, 2015 in U.S. Appl. No. 13/791,711.
Final Office Action dated Nov. 6, 2015 in U.S. Appl. No. 14/038,278.
Office Action dated Nov. 25, 2015 in U.S. Appl. No. 13/348,417.
Office Action dated Dec. 3, 2015 in U.S. Appl. No. 13/352,628.
Restriction Requirement dated Dec. 10, 2015 in U.S. Appl. No. 14/157,960.
Final Office Action dated Dec. 24, 2015 in U.S. Appl. No. 13/791,672.
Advisory Action dated Dec. 30, 2015 in U.S. Appl. No. 14/038,278.
Office Action dated Feb. 1, 2016 in U.S. Appl. No. 14/157,869.
Office Action dated Feb. 11, 2016 in U.S. Appl. No. 14/038,278.
Final Office Action dated Feb. 25, 2016 in U.S. Appl. No. 13/791,691.
Final Office Action dated Mar. 18, 2016 in U.S. Appl. No. 13/352,719.
Final Office Action dated Mar. 23, 2016 in U.S. Appl. No. 13/348,417.
Final Office Action dated Mar. 23, 2016 in U.S. Appl. No. 13/352,628.
Advisory Action dated Apr. 18, 2016 in U.S. Appl. No. 13/791,672.
Office Action dated May 5, 2016 in U.S. Appl. No. 14/157,960.
Advisory Action dated May 12, 2016 in U.S. Appl. No. 13/348,417.
Advisory Action dated May 12, 2016 in U.S. Appl. No. 13/352,719.
Advisory Action dated May 20, 2016 in U.S. Appl. No. 13/791,691.
Office Action dated May 20, 2016 in U.S. Appl. No. 13/791,711.
Advisory Action dated May 27, 2016 in U.S. Appl. No. 13/352,628.
Final Office Action dated Jun. 14, 2016 in U.S. Appl. No. 14/038,278.
Office Action dated Jun. 30, 2016 in U.S. Appl. No. 13/352,719.
Office Action dated Jul. 1, 2016 in U.S. Appl. No. 13/348,417.
Office Action dated Jul. 1, 2016 in U.S. Appl. No. 13/352,628.
Office Action dated Jul. 5, 2016 in U.S. Appl. No. 13/791,691.
Advisory Action dated Jul. 11, 2016 in U.S. Appl. No. 14/038,278.
Final Office Action dated Aug. 11, 2016 in U.S. Appl. No. 14/157,869.
Office Action dated Sep. 13, 2016 in U.S. Appl. No. 13/791,672.
Office Action dated Sep. 28, 2016 in U.S. Appl. No. 14/038,278.
Advisory Action dated Nov. 2, 2016 in U.S. Appl. No. 14/157,869.
Final Office Action dated Nov. 10, 2016 in U.S. Appl. No. 13/348,417.
Final Office Action dated Nov. 10, 2016 in U.S. Appl. No. 13/791,711.
Final Office Action dated Nov. 14, 2016 in U.S. Appl. No. 13/352,628.
Final Office Action dated Nov. 15, 2016 in U.S. Appl. No. 13/352,719.
Final Office Action dated Nov. 30, 2016 in U.S. Appl. No. 14/157,960.
Final Office Action dated Dec. 15, 2016 in U.S. Appl. No. 13/791,691.
Office Action dated Dec. 21, 2016 in U.S. Appl. No. 14/157,869.
Advisory Action dated Feb. 2, 2017 in U.S. Appl. No. 13/791,711.
Advisory Action dated Feb. 6, 2017 in U.S. Appl. No. 13/352,628.
Advisory Action dated Feb. 7, 2017 in U.S. Appl. No. 13/352,719.
Advisory Action dated Feb. 7, 2017 in U.S. Appl. No. 14/157,960.
Advisory Action dated Feb. 13, 2017 in U.S. Appl. No. 13/348,417.
Final Office Action dated Feb. 24, 2017 in U.S. Appl. No. 13/352,719.
Final Office Action dated Feb. 27, 2017 in U.S. Appl. No. 13/352,628.
Advisory Action dated Feb. 28, 2017 in U.S. Appl. No. 13/791,691.
Final Office Action dated Mar. 22, 2017 in U.S. Appl. No. 14/038,278.
Office Action dated Mar. 23, 2017 in U.S. Appl. No. 15/041,669.
Office Action dated Mar. 27, 2017 in U.S. Appl. No. 13/348,417.
Final Office Action dated Mar. 31, 2017 in U.S. Appl. No. 13/791,672.
Office Action dated Apr. 12, 2017 in U.S. Appl. No. 13/791,691.
Advisory Action dated Apr. 25, 2017 in U.S. Appl. No. 13/352,719.
Office Action dated May 4, 2017 in U.S. Appl. No. 13/352,719.
Advisory Action dated May 15, 2017 in U.S. Appl. No. 14/038,278.
Advisory Action dated May 22, 2017 in U.S. Appl. No. 13/352,628.
Office Action dated Jun. 6, 2017 in U.S. Appl. No. 13/352,628.
Final Office Action dated Jun. 7, 2017 in U.S. Appl. No. 14/157,869.
Final Office Action dated Jun. 16, 2017 in U.S. Appl. No. 14/038,278.
Notice of Allowance dated Jun. 27, 2017 in U.S. Appl. No. 13/791,672.
Office Action dated Jun. 27, 2017 in U.S. Appl. No. 14/157,960.
Final Office Action dated Jul. 27, 2017 in U.S. Appl. No. 13/791,691.
Final Office Action dated Aug. 11, 2017 in U.S. Appl. No. 13/352,719.
Advisory Action dated Aug. 16, 2017 in U.S. Appl. No. 14/157,869.
Final Office Action dated Aug. 17, 2017 in U.S. Appl. No. 13/348,417.
Advisory Action dated Aug. 23, 2017 in U.S. Appl. No. 14/038,278.
Office Action dated Sep. 8, 2017 in U.S. Appl. No. 13/791,711.
Advisory Action dated Sep. 28, 2017 in U.S. Appl. No. 13/791,691.
Final Office Action dated Oct. 4, 2017 in U.S. Appl. No. 15/041,669.
Final Office Action dated Oct. 5, 2017 in U.S. Appl. No. 13/352,628.
Advisory Action dated Oct. 17, 2017 in U.S. Appl. No. 13/348,417.
Advisory Action dated Oct. 12, 2017 in U.S. Appl. No. 13/352,719.
Advisory Action dated Nov. 15, 2017 in U.S. Appl. No. 15/041,669.
Final Office Action dated Dec. 21, 2017 in U.S. Appl. No. 14/157,960.
Advisory Action dated Jan. 26, 2018 in U.S. Appl. No. 14/157,960.
Final Office Action dated Feb. 7, 2018 in U.S. Appl. No. 13/791,711.
Advisory Action dated Mar. 30, 2018 in U.S. Appl. No. 13/791,711.
Non-Final Office Action dated Jul. 26, 2018 in U.S. Serial No/U.S. Appl. No. 13/791,711.
Final Office Action dated Oct. 19, 2018 in U.S. Appl. No. 13/791,711.
Advisory Action dated Nov. 5, 2018 in U.S. Appl. No. 13/791,711.
Non-Final Office Action dated Dec. 31, 2018 in U.S. Appl. No. 15/693,140.
Non-Final Office Action dated Feb. 7, 2019 in U.S. Appl. No. 15/695,466.
Final Office Action dated May 20, 2019 in U.S. Appl. No. 15/695,466.
Non-Final Office Action dated Jun. 26, 2019 in U.S. Appl. No. 13/791,711.
Advisory action dated Jun. 27, 19 in U.S. Appl. No. 15/695,446.
Final Office action dated Jul. 9, 19 in U.S. Appl. No. 15/693,140.
Non-Final Office Action dated Jul. 11, 2019 in U.S. Appl. No. 15/809,105.
Non-Final Office Action dated Jul. 25, 2019 in U.S. Appl. No. 15/823,888.
Non-Final Office Action dated Aug. 7, 2019 in U.S. Appl. No. 15/726,207.
Non-Final Office Action dated Sep. 26, 2019 in U.S. Appl. No. 15/793,676.
Boyd, "Revenue Management and Dynamic Pricing: Part 1," PROS Revenue Management, Sep. 2002, 77 pages, https://www.ima.umn.edu/talks/workshops/9-9-13.2002/boyd/boyd.ppt.
Williamson, "Comparison of Optimization Techniques for Origin-Destination Seat Inventory Control," Flight Transportation Laboratory Report R 88-2, pp. 1-169, May 1988.
"Fundamentals of Pricing and Revenue Management Chapter 4," George Mason University, Feb. 2010, 70 pages, retrieved from: http://catsr.ite.gmu.edu/SYST660/Chap4_Fundamentals_of_Pricing_and_Revenue_Management.pdf.
Kayser, "RM Methods for Multiple Fare Structure Environments," published by Massachusetts Institute of Technology on Jun. 2008, pp. 1-115.
Gorin, "Incorporating cancel and rebook behavior in revenue management optimization," published by Journal of Revenue and Pricing Management, vol. 11, No. 6, Jan. 24, 2012, pp. 645-660.
Fiig, "Optimization of mized far structures: Theory and applications," published by Journal of Revenue and Pricing Management, vol. 9, No. 1/2, Apr. 7, 2009, pp. 152-170.
Belobaba, "Airline Revenue Management: Flight Leg and Network Optimization—1.201 Transportation Systems Analysis: Demand & Economics," Fall 2008, http://ocw.mit.edu/courses/civil-and-environmental-engineering/1-201j-transportation-systems-analysis-demand-and-econimics-fall-2008/lecture-notes/MIT1_201JF08_lec17.pdf retrieved Apr. 20, 2015, 40 pages.
Department of Transportation, "Enhancing Airline Passenger Protections," http://web.archive.org/web/20121031135020/http://usatoday30.usatoday.com/travel/pdf/dot_enhancing_airline_passenger_protections.pdf, Oct. 31, 2012, retrieved Apr. 20, 2015, 84 pages.
Joseph Coughlan, "Airline Overbooking in the Multi-Class Case" dated Jan. 1, 1999, Dublin Institute of Technology, Journal of the Operational Research Society, vol. 50, 1999, pp. 1098-1103.
"Optimal Overbooking" dated Feb. 11, 2002 by Duke Mathematics Department, Team 180, 42 Pages.
Luke Ouko, Arnan Sipitakiat and Carla Gomez-Monroy, "Should Airlines Overbook?" dated May 12, 2003, Systems Dynamics for Engineers, 28 Pages.
Alexander Erdelyi and Huseyin Topaloglu, "A Dynamic Programming Decomposition Method for Making Overbooking Decisions over an Airline Network" dated Jun. 1, 2009, School of Operations Research and Information Engineering, Cornell University, Ithaca, New York, pp. 1-29.

(56) References Cited

OTHER PUBLICATIONS

Zhao et al. "A Dynamic Model for Airline Seat Allocation with Passenger Diversion and No-Shows"; Transportation Science, Feb. 2001, vol. 35, No. 1, pp. 80-98.
Cao et al. "Data mining Techniques to improve no-show forecasting" Service Operations and Logistics and Informatics (SOLI), 2010 IEEE International Conference Jul. 2010, pp. 40-45.
Garrow et al. "Predicting Air Travelers' No-Show and Standby Behavior Using Passenger and Directional Itinerary Information" Journal of Air Transport Management Jun. 23, 2004, pp. 1-32.
Illiescu, et al., "Analysis of U.S. Airlines Passengers' Refund and Exchange Behavior Across Multiple Airlines," pp. 1-25, May 2006.
USPTO; Non-Final Office Action dated Sep. 24, 2020 in U.S. Appl. No. 13/791,711.
USPTO; Final Office Action dated May 4, 2020 in U.S. Appl. No. 15/693,140.
USPTO; Advisory Action dated Jun. 2, 2020 in U.S. Appl. No. 15/693,140.
USPTO; Notice of Allowance dated Jul. 13, 2020 in U.S. Appl. No. 15/693,140.
USPTO; Non-Final Office Action dated May 21, 2020 in U.S. Appl. No. 15/823,888.
USPTO; Notice of Allowance dated Jul. 1, 2020 in U.S. Appl. No. 15/823,888.
USPTO; Notice of Allowance dated Jul. 16, 2020 in U.S. Appl. No. 15/823,888.
USPTO; Advisory Action dated May 18, 2020 in U.S. Appl. No. 15/884,094.
USPTO; Notice of Allowance dated Jul. 10, 2020 in U.S. Appl. No. 15/884,094.
El-Haber, Sharbel and El-Taha, Muhammad, "Dynamic two-leg airline seat inventiory control with overbooking, cancellations and no-shows," Journal of Revenue and Pricing Management, vol. 3, No. 2, 2004, pp. 143-170.
Talluri, Kalyan and van Ryzon, Garrett, "An Analysis of Bid-Price Controls for Network Revenue Managment," Management Science/ vol. 44, Part 1 of 2, Nov. 1998.
Chatwin, Richard," Multiperiod Airline Overbooking with a Single Fare Class," Operations Research, vol. 46, No. 6, Nov.-Dec. 1998.
Pak, Kevin and Piersma, Nanda, "Overview of OR Techniques for Airline Revenue Management," Statistica Neerlandica (2002) bol. 56, nr. 4, pp. 479-495.
USPTO; Final Office Action dated Nov. 13, 2020 in U.S. Appl. No. 13/791,711.
USPTO; Advisory Action dated Dec. 3, 2020 in U.S. Appl. No. 13/791,711.
USPTO; Final Office Action dated Jan. 28, 2020 in U.S. Appl. No. 15/884,094.
USPTO; Final Office Action dated Feb. 6, 2020 in U.S. Appl. No. 15/695,446.
USPTO; Final Office Action dated Feb. 7, 2020 in U.S. Appl. No. 15/793,676.
USPTO; Final Office Action dated Feb. 13, 2020 in U.S. Appl. No. 15/812,723.
USPTO; Notice of Allowance dated Feb. 21, 2020 in U.S. Appl. No. 15/726,207.
USPTO; Advisory Action dated Feb. 28, 2020 in U.S. Appl. No. 15/695,446.
USPTO; Advisory Action dated Feb. 28, 2020 in U.S. Appl. No. 15/793,676.
USPTO; Advisory Action dated Feb. 28, 2020 in U.S. Appl. No. 15/812,723.
USPTO; Advisory Action dated Feb. 28, 2020 in U.S. Appl. No. 15/809,105.
USPTO; Advisory Action dated Feb. 28, 2020 in U.S. Appl. No. 15/823,888.
Advisory dated Aug. 19, 2019 in U.S. Appl. No. 15/693,140.
Non-Finai Office Action dated Sep. 3, 2019 in U.S. Appl. No. 15/884,094.
Final Office Action dated Sep. 5, 2019 in U.S. Appl. No. 15/809,105.
Final Office Action dated Sep. 12, 2019 in U.S. Appl. No. 13/791,711.
Non-Final Office Action dated Sep. 30, 2019 in U.S. Appl. No. 15/812,723.
Non-Final Office Action dated Nov. 18, 2019 in U.S. Appl. No. 15/693,140.
Advisory Action dated Nov. 27, 2019 in U.S. Appl. No. 13/791,711.
Advisory Action dated Nov. 29, 2019 in U.S. Appl. No. 15/809,105.
Final Office Action dated Dec. 31, 2019 in U.S. Appl. No. 15/809,105.
Final Office Action dated Jan. 14, 2020 in U.S. Appl. No. 15/823,888.
Final Office Action dated Jan. 22, 2020 in U.S. Appl. No. 15/726,207.
USPTO, Final Office Action dated Aug. 18, 2021 in U.S. Appl. No. 13/791,711.
USPTO, Final Office Action dated Nov. 24, 2021 in U.S. Appl. No. 13/791,711.
USPTO, Notice of Allowance dated Jan. 7, 2022 in U.S. Appl. No. 13/791,711.
USPTO, Final Office Action dated Mar. 9, 2022 in U.S. Appl. No. 16/907,623.
USPTO, Final Office Action dated Mar. 17, 2022 in U.S. Appl. No. 16/907,665.
USPTO, Final Office Action dated Mar. 21, 2022 in U.S. Appl. No. 16/907,694.
USPTO, Advisory Action dated May 6, 2022 in U.S. Appl. No. 16/907,623.
USPTO, Advisory Action dated May 6, 2022 in U.S. Appl. No. 16/907,665.
USPTO, Advisory Action dated May 9, 2022 in U.S. Appl. No. 16/907,694.
USPTO, Non-Final Office Action dated May 6, 2022 in U.S. Appl. No. 16/930,801.
"Fundamental Pricing and Revenue Management Chapter 4," Apr. 2015, <https://castr.vse.gmu.edu/SYST660/Chap4_Fundamentals_of_Pricing_and_Revenue_Management.pdf>.
USPTO, Non-Final Office Action dated Jun. 23, 2022 in U.S. Appl. No. 16/991,470.
USPTO, Non-Final Office Action dated Jul. 22, 2022 in U.S. Appl. No. 16/991,588.
USPTO, Final Office Action dated Jun. 24, 2022 in U.S. Appl. No. 16/907,623.
USPTO, Final Office Action dated Jun. 24, 2022 in U.S. Appl. No. 16/907,665.
USPTO, Final Office Action dated Jun. 24, 2022 in U.S. Appl. No. 16/907,694.
USPTO, Final Office Action dated Oct. 12, 2022 in U.S. Appl. No. 16/854,673.
USPTO, Final Office Action dated Sep. 19, 2022 in U.S. Appl. No. 16/930,801.
Ratliff, "a multi-flight recapture heuristic for estimating unconstrained demand from airline bookings", published by palgrave journals in 2007, all pages. (Year: 2007).
Reyes, "Hybrid Forecasting for airline revenue management in Semi restricted fare structures", published by MIT in 2006, all pages. (Year: 2006).
Savoyen, "Airline revenue management methods for less restricted fare structures", published by MIT in 2005, all pages. (Year: 2005).
Skwarek, "Competitive Impacts of Yield Management System Components: Forecasting and Sell-up Models", published by MIT in 1994, all pages. (Year: 1994).
Temath, "Performance measurement in airline revenue management—a simulation based assessment of the network based revenue opportunity model", published by Univeristy of Paderborn in 2010, all pages. (Year: 2010).
Saleh, "a new unconstraining method for demand forecasting", published by IEEE in 2012, all pages (Year: 2012).
Guo, "Unconstraining methods in revenue management systems: research overview and prospects", published by Hindawi Publishing Corp. in 2012, all pages (Year: 2012).
Koole, "estimating unconstrained customer choice set demand: a case study on airline reservation data", published by Journal of Choice Modeling in 2011, all pages (Year: 2011).
Cleophas, "Simulation-based analyiss of forecast performance evaluations for airline revenue management", published by Core in Jul. 2009, all pages (Year: 2009).

(56) References Cited

OTHER PUBLICATIONS

Wickham, "Evaluation of Forecasting Techniques for Short Term Demand of Air transportation", published by MIT in 1993, all pages (Year: 1993).
Williamson, "Airline Network Seat Inventory control: Methodologies and Revenue Impacts", published by MIT in 1986, all pages (Year: 1986).
Belobaba, "Air Travel Demand and Airline Seat Inventory Management", published by MIT in 1982, all pages (Year 1982).
USPTO, Final Office Action dated Sep. 19, 2022 in U.S. Appl. No. 16/991,470.
Notice of Allowance dated Nov. 23, 2022 in U.S. Appl. No. 16/930,801.
Notice of Allowance dated Nov. 23, 2022 in U.S. Appl. No. 16/991,470.
USPTO, Advisory Action dated Sep. 14, 2022 in U.S. Appl. No. 16/907,623.

\* cited by examiner

200

```
┌─────────────────────────────────────┐
│   CONVERT NEW BOOKINGS TO TOP-DOWN  │
│              FORMAT                 │
│               210                   │
└─────────────────┬───────────────────┘
                  ▼
┌─────────────────────────────────────┐
│  CALCULATE MEAN AND STANDARD        │
│  DEVIATION FOR THE CURRENT FARE     │
│  CLASS                              │
│               220                   │
└─────────────────┬───────────────────┘
                  ▼
┌─────────────────────────────────────┐
│  IF CURRENT FARE CLASS IS OBSCURED, │
│  CALCULATE UNOBSCURED DEMAND        │
│               230                   │
└─────────────────┬───────────────────┘
                  ▼
┌─────────────────────────────────────┐
│  USE UNOBSCURED DEMAND OF CHILD     │
│  CLASS AS UPPER BOUND FOR EACH      │
│  PARENT CLASS                       │
│               240                   │
└─────────────────┬───────────────────┘
                  ▼
┌─────────────────────────────────────┐
│  CONVERT UNOBSCURED DEMAND FOR EACH │
│  FARE CLASS INTO DISCRETE VALUES    │
│               250                   │
└─────────────────┬───────────────────┘
                  ▼
┌─────────────────────────────────────┐
│  OUTPUT UPDATED DEMAND FORECAST OR  │
│  UPDATED BOOKING INFORMATION        │
│               260                   │
└─────────────────────────────────────┘
```

```
┌─────────────────────────────────┐
│   IDENTIFY NET PRIME BOOKINGS   │
│              510                │
└─────────────────────────────────┘
                │
                ▼
┌─────────────────────────────────┐
│ CALCULATE FLOOR CLASS FOR EACH  │
│         NET PRIME BOOKING       │
│              520                │
└─────────────────────────────────┘
                │
                ▼
┌─────────────────────────────────┐
│ IF FLOOR CLASS IS CLOSED,       │
│ CALCULATE DISPLACEMENT CLASS    │
│ FOR EACH NET PRIME BOOKING      │
│              530                │
└─────────────────────────────────┘
                │
                ▼
┌─────────────────────────────────┐
│ REMAP EACH NET PRIME BOOKING    │
│       TO ITS TARGET CLASS       │
│              540                │
└─────────────────────────────────┘
                │
                ▼
┌─────────────────────────────────┐
│   GENERATE CUMULATIVE BOOKING   │
│            INFORMATION          │
│              550                │
└─────────────────────────────────┘
                │
                ▼
┌─────────────────────────────────┐
│  UNMAP CANCELLED PRIME CLASS    │
│  BOOKINGS FROM THE LOWEST       │
│  PREVIOUSLY REMAPPED CLASS      │
│              560                │
└─────────────────────────────────┘
```

FIG. 5

FARE CLASSES WITH OBSCURED DEMAND

CROSS-REFERENCE TO RELATED APPLICATIONS

This application is a continuation of, claims priority to and the benefit of, U.S. Ser. No. 15/654,240 filed Jul. 19, 2017 and entitled "AIRLINE DEMAND FORECASTING UTILIZING UNOBSCURING AND UNCONSTRAINING." The '240 application is a continuation of, claims priority to and the benefit of, U.S. Ser. No. 13/791,672 filed on Mar. 8, 2013, (aka U.S. Pat. No. 9,727,940, which issued Aug. 8, 2017) and entitled "DEMAND FORECASTING SYSTEMS AND METHODS UTILIZING UNOBSCURING AND UNCONSTRAINING". Both are hereby incorporated by reference in their entirety for all purposes.

TECHNICAL FIELD

The present disclosure generally relates to forecasting, and more particularly, to analysis methods and tools suitable for use in connection with yield management systems, inventory control systems, revenue management systems, and the like.

BACKGROUND

The transportation services industry, and particularly the airline industry, is often associated with high costs and varying degrees of profitability. As a result, airlines often seek new sources of income (e.g., ala carte pricing for additional services) and innovative ways to increase revenues and/or reduce costs (e.g., optimizing existing processes). One such method of increasing revenues involves pricing seats on a particular flight in groups or "classes". Bookings in higher-fare classes are typically given priority in order to increase the total revenue associated with a flight.

However, in many instances, a passenger may book a reservation at a lower price point than the maximum amount the passenger would be willing to pay for that seat. The difference in price between the higher-priced ticket and the purchased ticket represents foregone revenue for the airline. Accordingly, improved forecasting and analysis methods remain desirable, for example, for use in systems configured to allow airlines to book seats at prices more closely associated with the maximum amount a passenger is willing to pay.

SUMMARY

In an embodiment, a method comprises accessing, by a processor for unobscuring demand, a bookings table representing seat bookings for a flight. The seat bookings occurred during a first time period, and the seat bookings are grouped into a plurality of fare classes. The method further comprises: determining, by the processor, which fare classes in the plurality of fare classes have demand that is obscured; calculating, by the processor, the unobscured demand for at least one fare class in the plurality of fare classes; converting, by the processor, the unobscured demand for the at least one fare class into integer values representing seat bookings in the respective fare classes; and updating, by the processor, the bookings table with the integer values to form an unobscured bookings table.

In another embodiment, a method comprises: accessing, by a processor for unconstraining demand, an unobscured bookings table representing unobscured demand for seat bookings in a plurality of fare classes; determining, by the processor, the fare classes in the plurality of fare classes for which demand is constrained; calculating, by the processor, the unconstrained demand for each constrained fare class in the plurality of fare classes; converting, by the processor, the unconstrained demand for each fare class into integer values representing seat bookings in the respective fare classes; and updating, by the processor, the unobscured bookings table with the integer values to form an unconstrained bookings table.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 2A illustrates an exemplary unobscuring method in accordance with various embodiments;

FIG. 5 illustrates a method for prime class remapping in accordance with various embodiments.

DETAILED DESCRIPTION

Figure 1A:
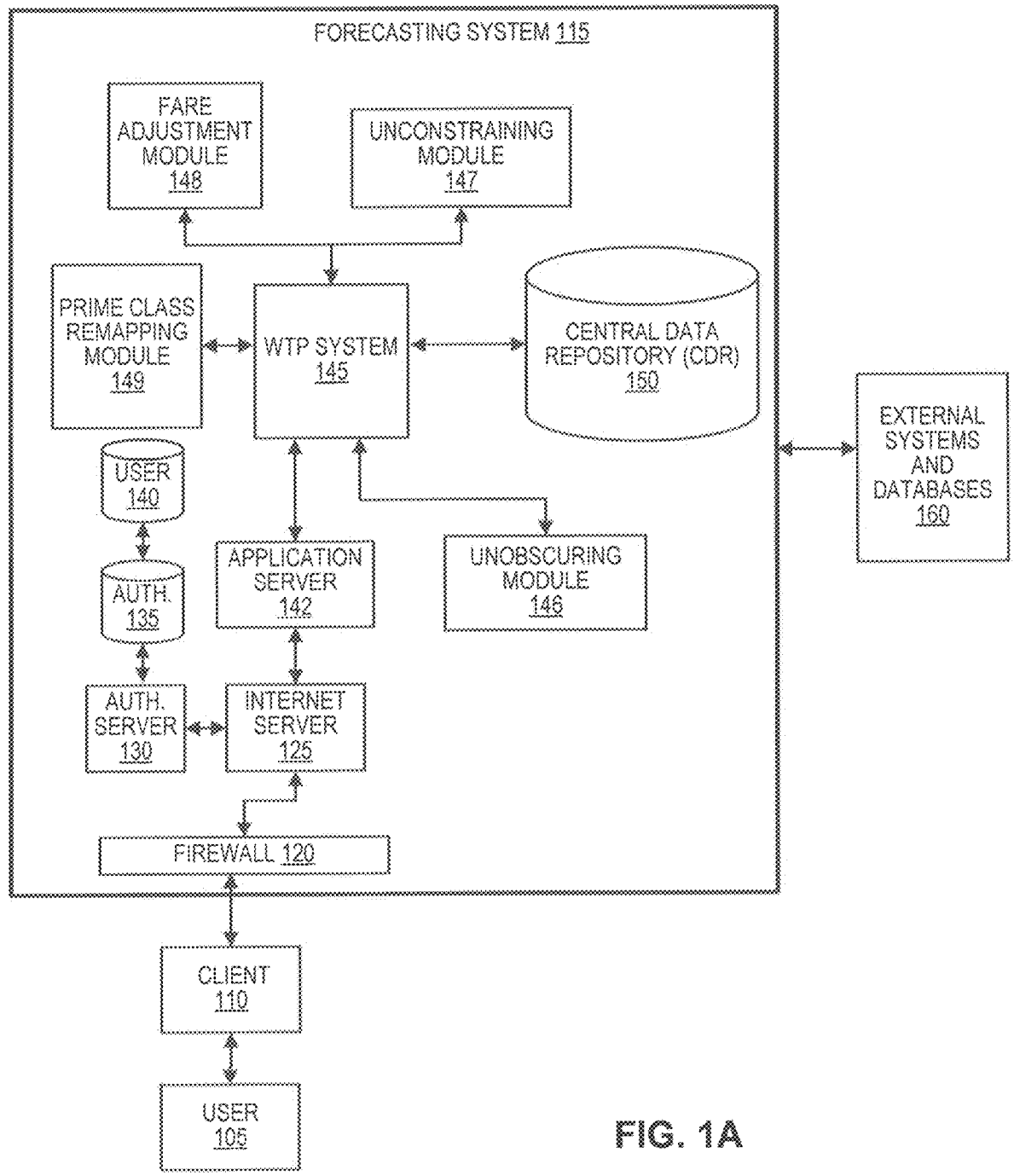
FIG. 1A is a block diagram illustrating exemplary forecasting system components in accordance with various embodiments.

Principles of the present disclosure can reshape the way organizations forecast, calculate, and/or implement decisions, such as revenue management and/or cost reduction strategies. For example, principles of the present disclosure enable airlines to:

formulate more accurate answers to the question, "How many (and what type) of bookings would have been realized if a particular fare class (or set of fare classes) were closed?";

formulate more accurate answers to the question, "How many (and what type) of bookings would have been realized if a particular fare class (or set of fare classes) were opened?";

realize bookings that are more closely aligned with the highest price a customer is actually willing to pay for a particular seat;

adjust, at discrete intervals and/or in real-time, demand forecasts for particular fare classes and implement fare class openings/closings in order to increase and/or maximize revenue; stated generally, principles of the present disclosure enable airlines to reduce forecasting errors and account for interdependence of demand between fare classes.

While the present disclosure discusses airlines and "flights" for purposes of convenience and illustration, one of skill in the art will appreciate that the forecasting methods, systems, and tools disclosed herein are broadly applicable, for example to any transportation industry, such as buses, cruise ships, passenger trains, and the like.

Various embodiments of principles of the present disclosure employ forecasting, statistical analysis and/or optimization techniques. For more information regarding such techniques refer to, for example: "The Theory and Practice of Revenue Management" (International Series in Operations Research & Management Science) by Kalyan T. Talluri and Garrett J. van Ryzin; "Using Multivariate Statistics (5th Edition)" by Barbara G. Tabachnick and Linda S. Fidell; and "Introduction to Operations Research" by Friedrich S. Hiller and Gerald J. Lieberman, McGraw-Hill 7th edition, Mar. 22, 2002; the contents of which are each hereby incorporated by reference in their entireties.

In various embodiments, exemplary forecasting systems include a user interface ("UI"), software modules, logic engines, various databases, interfaces to systems and tools, and/or computer networks. While exemplary forecasting systems may contemplate upgrades or reconfigurations of existing processing systems, changes to existing databases and system tools are not necessarily required by principles of the present disclosure.

The benefits provided by principles of the present disclosure include, for example, increased revenue, increased forecasting accuracy, lower costs, increased seat utilization, increased customer good will, increased planning and operational efficiency, and increased employee morale. For example, a revenue management organization benefits from improved forecasting accuracy and resulting increased revenue. Customers benefit from booking availability that more closely tracks their willingness to pay, increasing the likelihood of a suitable seat and associated fare being available for them.

As used herein: a "fare class" or "class" refers to a group of airline seats that are priced similarly to one another.

"Willingness to pay" refers to the highest fare class a customer will pay for a product, such as a seat on a flight (i.e., analogous to a reserve price).

"Buy down" refers to a booking being realized in a class that is lower than the customer's willingness to pay.

"Spiral down" refers to repeated buy down cycles; when forecasts and seat protects are based on observed bookings rather than willingness to pay, leading to future bookings in lower classes.

A "constrained class" is a class where bookings are restricted by availability in that class.

An "obscured class" is a class where bookings are restricted due to availability of the same product in a lower fare class.

An "active class" or "observed class" is the lowest class with availability and bookings. Lower classes are constrained and higher classes are obscured.

A "parent class" and "child class" are the fare classes directly above and below the other, respectively.

A "cohort" is a group of flights having similar characteristics, such that statistical information for some (or all) of the flights in the cohort may be utilized to draw inferences regarding one or more flights in the cohort.

An "entity" may include any individual, software program, business, organization, government entity, web site, system, hardware, and/or any other entity.

A "user" may include any entity that interacts with a system and/or participates in a process.

Turning now to FIG. 1A, in accordance with various embodiments, a user 105 may perform tasks such as requesting, retrieving, receiving, updating, analyzing and/or modifying data. User 105 may also perform tasks such as initiating, manipulating, interacting with or using a software application, tool, module or hardware, and initiating, receiving or sending a communication. User 105 may interface with Internet server 125 via any communication protocol, device or method discussed herein, known in the art, or later developed. User 105 may be, for example, a member of a revenue management organization, a member of an operations research and systems analysis organization, a downstream system, an upstream system, a third-party system, a system administrator, and/or the like.

In various embodiments, a system 101 may include a user 105 interfacing with a forecasting system 115 by way of a client 110. Forecasting system 115 may be a partially or fully integrated system comprised of various subsystems, modules and databases. Client 110 comprises any hardware and/or software suitably configured to facilitate entering, accessing, requesting, retrieving, updating, analyzing and/or modifying data. The data may include operational data (e.g., schedules, resources, routes, operational alerts, weather, etc.), passenger data, cost data, forecasts, historical data, verification data, asset (e.g., airplane) data, inventory (e.g., airplane seat) data, legal/regulatory data, authentication data, demographic data, transaction data, or any other suitable information discussed herein.

Client 110 includes any device (e.g., a computer), which communicates, in any manner discussed herein, with forecasting system 115 via any network or protocol discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand-held computers, portable computers, kiosks, and/or the like. Practitioners will appreciate that client 110 may or may not be in direct contact with forecasting system 115. For example, client 110 may access the services of forecasting system 115 through another server, which may have a direct or indirect connection to Internet server 125. Practitioners will further recognize that client 110 may present interfaces associated with a software application (e.g., SAS analytic software) or module that are provided to client 110 via application GUIs or other interfaces and are not necessarily associated with or dependent upon internet browsers or internet specific protocols.

User 105 may communicate with forecasting system 115 through a firewall 120, for example to help ensure the integrity of forecasting system 115 components. Internet server 125 may include any hardware and/or software suitably configured to facilitate communications between the client 110 and one or more forecasting system 115 components.

Firewall 120, as used herein, may comprise any hardware and/or software suitably configured to protect forecasting system 115 components from users of other networks. Firewall 120 may reside in varying configurations including stateful inspection, proxy based and packet filtering, among others. Firewall 120 may be integrated as software within Internet server 125, any other system 101 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to predefined privileges associated with the credentials. Authentication server 130 may grant varying degrees of application and/or data level access to users based on information stored within authentication database 135 and user database 140. Application server 142 may include any hardware and/or software suitably configured to serve applications and data to a connected client 110.

In accordance with various embodiments, forecasting system 115 is usable to increase and/or maximize revenue, manage inventory strategy, generate inputs to other forecasting systems, and/or the like. Continuing to reference FIG. 1A, forecasting system 115 allows communication with central data repository (CDR) 150, and with various other databases, tools, UIs and systems (not shown in FIG. 1A). Such systems include, for example, airline scheduling systems, passenger booking and reservations systems, revenue management systems, inventory systems, and/or the like.

Forecasting system 115 components are interconnected and communicate with one another to allow for a completely integrated forecasting system. In various embodiments, forecasting system 115 formulates demand forecast models and associated revenue consequences at the class level, seat level, and so forth. Airline reservations systems sell inventory based at least in part upon the output of forecasting system 115.

In various embodiments, forecasting system 115 modules (e.g., willingness to pay (WTP) system 145, unobscuring module 146, unconstraining module 147, fare adjustment module 148, prime-class remap module 149, and other forecasting system 115 modules not shown in FIG. 1A) are software modules configured to enable online functions such as sending and receiving messages, receiving query requests, configuring responses, dynamically configuring user interfaces, requesting data, receiving data, displaying data, executing complex processes, calculations, forecasts, mathematical techniques, workflows and/or algorithms, prompting user 105, verifying user responses, authenticating the user, initiating forecasting system 115 processes, initiating other software modules, triggering downstream systems and processes, encrypting and decrypting, and/or the like. Additionally, forecasting system 115 modules may include any hardware and/or software suitably configured to receive requests from client 110 via Internet server 125 and application server 142.

Forecasting system 115 modules may be further configured to process requests, execute transactions, construct database queries, and/or execute queries against databases within system 101 (e.g., central data repository ("CDR") 150), external data sources and/or temporary databases. In various embodiments, one or more forecasting system 115 modules may be configured to execute application programming interfaces in order to communicate with a variety of messaging platforms, such as email systems, wireless communications systems, mobile communications systems, multimedia messaging service ("MMS") systems, short messaging service ("SMS") systems, and the like.

Forecasting system 115 modules may be configured to exchange data with other systems and application modules, for example an airline reservation system. In various embodiments, forecasting system 115 modules may be configured to interact with other system 101 components to perform complex calculations, retrieve additional data, format data into reports, create XML representations of data, construct markup language documents, construct, define or control UIs, and/or the like. Moreover, forecasting system 115 modules may reside as standalone systems or tools or may be incorporated with the application server 142 or any other forecasting system 115 component as program code. As one of ordinary skill in the art will appreciate, forecasting system 115 modules may be logically or physically divided into various subcomponents, such as a workflow engine configured to evaluate predefined rules and to automate processes.

In addition to the components described above, forecasting system 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; a plurality of databases, and/or the like.

As will be appreciated by one of ordinary skill in the art, one or more system 101 components may be embodied as a customization of an existing system, an add-on product, upgraded software, a stand-alone system (e.g., kiosk), a distributed system, a method, a data processing system, a device for data processing, and/or a computer program product. Accordingly, individual system 101 components may take the form of an entirely software embodiment, an entirely hardware embodiment, or an embodiment combining aspects of both software and hardware. Furthermore, individual system 101 components may take the form of a computer program product on a computer-readable storage medium having computer-readable program code means embodied in the storage medium. Any suitable computer-readable storage medium may be utilized, including magnetic storage devices (e.g., hard disks), optical storage devices, (e.g., DVD-ROM, CD-ROM, etc.), electronic storage devices (e.g., flash memory), and/or the like.

Client 110 may include an operating system (e.g., Windows, UNIX, Linux, Solaris, MacOS, iOS, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package. Client 110 and forecasting system 115 components may be independently, separately or collectively suitably coupled to the network via data links which include, for example, a connection to an Internet Service Provider (ISP) over the local loop as is typically used in connection with standard wireless communications networks and/or methods, such as modem communication, cable modem, satellite networks, ISDN, digital subscriber line (DSL), and/or the like. In various embodiments, any portion of client 110 may be partially or fully connected to a network using a wired ("hard wire") connection. As those skilled in the art will appreciate, client 110 and/or any of the system components may include wired and/or wireless portions.

Internet server 125 may be configured to transmit data to client 110 within markup language documents. "Data" may include encompassing information such as commands, messages, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users (such as user 105). In various embodiments, Microsoft Internet Information Server (IIS), Microsoft Transaction Server (MTS), and Microsoft SQL Server, are used in conjunction with a Microsoft operating system, Microsoft NT web server software, a Microsoft SQL Server database system, and a Microsoft Commerce Server. In various embodiments, the well-known "LAMP" stack (Linux, Apache, MySQL, and PHP/Perl/Python) are used to enable forecasting system 115. Additionally, components such as Access or Microsoft SQL Server, Oracle, Sybase, InterBase, etc., may be used to provide an Active Data Object (ADO) compliant database management system.

Like Internet server 125, application server 142 may communicate with any number of other servers, databases and/or components through any means known in the art. Further, application server 142 may serve as a conduit between client 110 and the various systems and components of forecasting system 115. Internet server 125 may interface with application server 142 through any means known in the art including a LAN/WAN, for example. Application server 142 may further invoke software modules, such as WTP system 145, automatically or in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A server may include a web service that receives a request from a web server, the request including a URL (e.g., http://yahoo.com/) and/or an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

Continuing to reference FIG. 1A, illustrated are databases that are included in various embodiments. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within system 101 may represent multiple hardware, software, database, data structure and networking components. Furthermore, embodiments are not limited to the databases described herein, nor do embodiments necessarily utilize each of the disclosed databases.

Authentication database 135 may store information used in the authentication process such as, for example, user identifiers, passwords, access privileges, user preferences, user statistics, and the like. User database 140 maintains user information and credentials for forecasting system 115 users (e.g., user 105).

In various embodiments, CDR 150 is a data repository that may be configured to store a wide variety of comprehensive data for forecasting system 115. While depicted as a single logical entity in FIG. 1A, those of skill in the art will appreciate that CDR 150 may, in various embodiments, consist of multiple physical and/or logical data sources. In various embodiments, CDR 150 stores operational data, schedules, resource data, asset data, inventory data, personnel information, routes and route plans, station (e.g., airports or other terminals) data, operational alert data, weather information, passenger data, reservation data, cost data, optimization results, booking class data, forecasts, historical data, verification data, authentication data, demographic data, legal data, regulatory data, transaction data, security profiles, access rules, content analysis rules, audit records, predefined rules, process definitions, financial data, and the like. For example, in various exemplary embodiments a data source or component database of CDR 150 includes information such as flight key (e.g., flight number, flight date, origin, and destination), forecast timeband, days until departure ("Rel Day"), class demand, a class posted indicator (i.e., an indication of whether or not a class was available for sale during a time period), class bookings information, class average fare, active class by Rel Day, seasonal identifiers, sponsor identifiers, and/or the like.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system may employ any number of conventional techniques for data transmission, signaling, data processing, network control, and the like. Still further, the system may be used to detect or prevent security issues with a client-side scripting language, such as JavaScript, VBScript or the like.

Software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

With continued reference to FIG. 1A, in various embodiments, user 105 logs onto an application (e.g., a module) and Internet server 125 may invoke an application server 142. Application server 142 invokes logic in the forecasting system 115 modules by passing parameters relating to user's 105 requests for data. Forecasting system 115 manages requests for data from forecasting system 115 modules and/or communicates with system 101 components. Transmissions between user 105 and Internet server 125 may pass through a firewall 120 to help ensure the integrity of forecasting system 115 components. Practitioners will appreciate that exemplary embodiments may incorporate any number of security schemes or none at all. In various embodiments, Internet server 125 receives requests from client 110 and interacts with various other system 101 components to perform tasks related to requests from client 110.

Internet server 125 may invoke an authentication server 130 to verify the identity of user 105 and assign roles, access rights and/or permissions to user 105. In order to control access to the application server 142 or any other component of forecasting system 115, Internet server 125 may invoke an authentication server 130 in response to user 105 submissions of authentication credentials received at Internet server 125. In response to a request to access system 101 being received from Internet server 125, Internet server 125 determines if authentication is required and transmits a prompt to client 110. User 105 enters authentication data at client 110, which transmits the authentication data to Internet server 125. Internet server 125 passes the authentication data to authentication server 130 which queries the user database 140 for corresponding credentials. In response to user 105 being authenticated, user 105 may access various applications and their corresponding data sources.

Figure 1B:
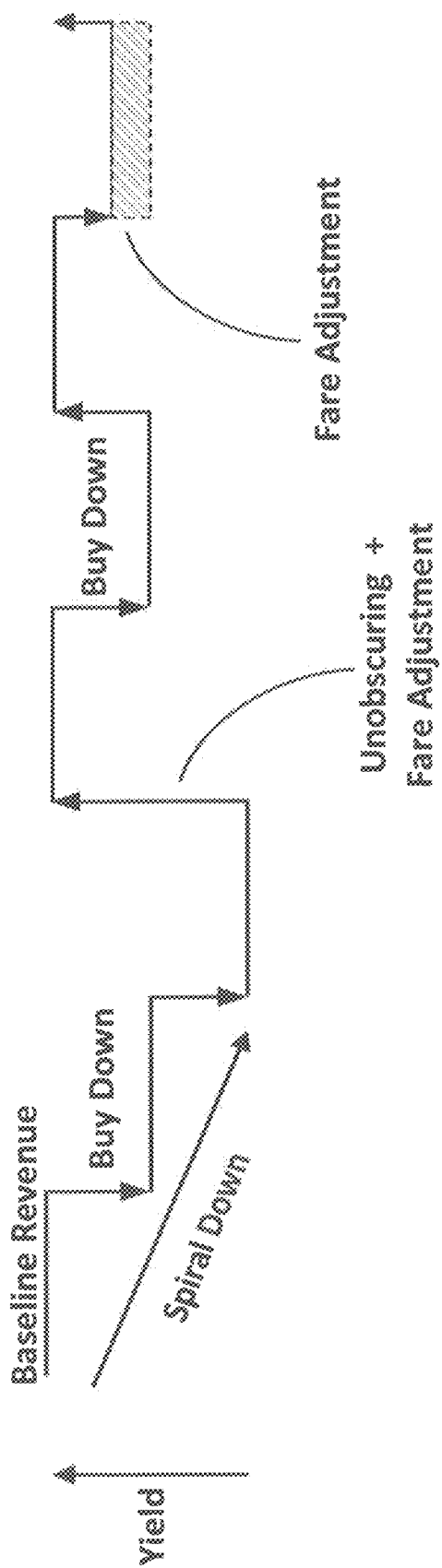
FIG. 1B illustrates exemplary approaches for yield management, including reducing spiral down in accordance with various embodiments.

With reference now to FIGS. 1A and 1B, various prior approaches to airline seat demand forecasting have suffered from various shortcomings, for example susceptibility to spiral down. Prior demand forecasts were typically based on actual seat bookings, leading to repeated cycles of fare deterioration as additional groups of lower priced seats were released for sale based on inaccurate demand estimates. Additionally, prior demand forecasts typically assumed, inaccurately, that demand for a particular fare class was independent of demand for other fare classes.

In contrast, principles of the present disclosure contemplate approaches to demand forecasting, wherein interrelationships among demand for fare classes are taken into account. For example, interrelationships among demand for fare classes may arise anytime that there is more than one valid fare for a particular seat on a flight. In various embodiments, airline seat demand forecasting systems and methods are configured to consider that a particular fare class, while open, may be effectively closed due to seat availability in a lower fare class or classes. Such open fare classes may be referred to as "obscured", as demand for such fare classes is not readily apparent. Principles of the present disclosure may be utilized to "unobscure" (or otherwise improve) demand forecasts for such fare classes.

In various embodiments, unobscuring module 146 is configured to generate and/or modify an improved demand forecast for a fare class or set of fare classes. Moreover, unobscuring module 146 may be configured to revise and/or modify historical booking information to represent unobscured booking information. Stated generally, unobscuring module 146 is configured to provide an answer to the question: "For a particular fare class $F_i$, how many bookings would have been taken if the fare classes below $F_i$ were closed?"

Unobscuring module 146 may utilize historical data regarding seat bookings for a prior period of time, for example the prior 52 weeks of booking information. Moreover, any suitable amount of historical data may be utilized. Unobscuring module 146 may also utilize information such as flight key (e.g., flight number, flight date, origin, and destination), forecast timeband, days until departure ("Rel Day"), a class posted indicator, class bookings information, seasonal identifiers, sponsor identifiers, and/or the like.

In various embodiments, unobscuring module 146 is configured to generate predicted booking information that differs from actual observed bookings. In various embodiments, unobscuring module 146 generates demand forecasts directly; in other exemplary embodiments, predicted booking information generated by unobscuring module 146 may be delivered to other electronic systems (for example, Passenger Revenue Optimization System or "PROS" offered by PROS Holdings, Inc.) in lieu of actual observed booking information, in order to generate improved demand forecasts.

In various embodiments, unobscuring module 146 processes net individual seat bookings that occurred between a first point in time (which may be a "data collection point" or DCP) and a second point in time (which may be, but is not necessarily, a second DCP). Table 1A illustrates an exemplary snapshot of total bookings for a particular example Flight 244, scheduled for travel from Detroit (DTW) to Phoenix (PHX). In Table 1A, total bookings are represented as of a particular DCP (for example, at example DCP 19, which is a point in time 8 days prior to the scheduled departure of Flight 244). In Table 1A, total bookings are listed by fare class in descending price order.

TABLE 1A

Total bookings for Flight 244 as of DCP 19

| Fare Class | Total Bookings to Date |
|---|---|
| Q | 1 |
| N | 1 |
| V | 8 |
| W | 15 |
| L | 9 |
| S | 7 |
| T | 19 |
| G | 7 |
| K | 15 |
| U | 7 |
| E | 5 |
| R | 0 |

Continuing this example, in the time period between the current DCP 19 and the prior DCP 18, the following new bookings for Flight 244 occurred:

TABLE 1B

New Bookings for Flight 244 Occurring Between DCP 18 and DCP 19

| Fare Class | New Bookings |
|---|---|
| Q | 0 |
| N | 0 |
| V | 0 |
| W | 3 |
| L | 0 |
| S | 0 |
| T | 1 |
| G | 0 |
| K | 4 |
| U | 0 |
| E | 0 |
| R | 0 |

To facilitate improved demand forecasting approaches and/or to facilitate interactions with other components of system 101 (for example, external systems and databases 160), the booking information in Tables 1A and/or 1B may also be considered in "top-down" form, wherein the booking number associated with each fare class represents the sum of bookings in that fare class as well as all higher fare classes. Converting the new booking information in Table 1B to top-down form, Table 1C is obtained:

TABLE 1C

| Fare Class | New Bookings | New Bookings (Top-Down) |
|---|---|---|
| Q | 0 | 0 |
| N | 0 | 0 |
| V | 0 | 0 |
| W | 3 | 3 |
| L | 0 | 3 |
| S | 0 | 3 |
| T | 1 | 4 |
| G | 0 | 4 |
| K | 4 | 8 |
| U | 0 | 8 |
| E | 0 | 8 |
| R | 0 | 8 |

With the example data formatted as illustrated in Table 1C, a baseline assumption about bookings for this example Flight 244 can be inferred, namely: if, during the current period (i.e., between DCP 18 and DCP 19), fare classes U through R were not open for bookings, Flight 244 would have received at least 8 bookings (i.e., a number equal to the actual bookings). However, if fare class K was not open for bookings, Flight 244 might still have received the four bookings taken in fare class K (i.e., in fare class G or another higher class); however, it is also possible that only three, or two, or one, or zero of the observed K class bookings would have occurred. Because of this uncertainty, the actual demand for bookings in fare class G may be considered to be obscured. All fare classes above class G may also be considered obscured.

Figure 2B:
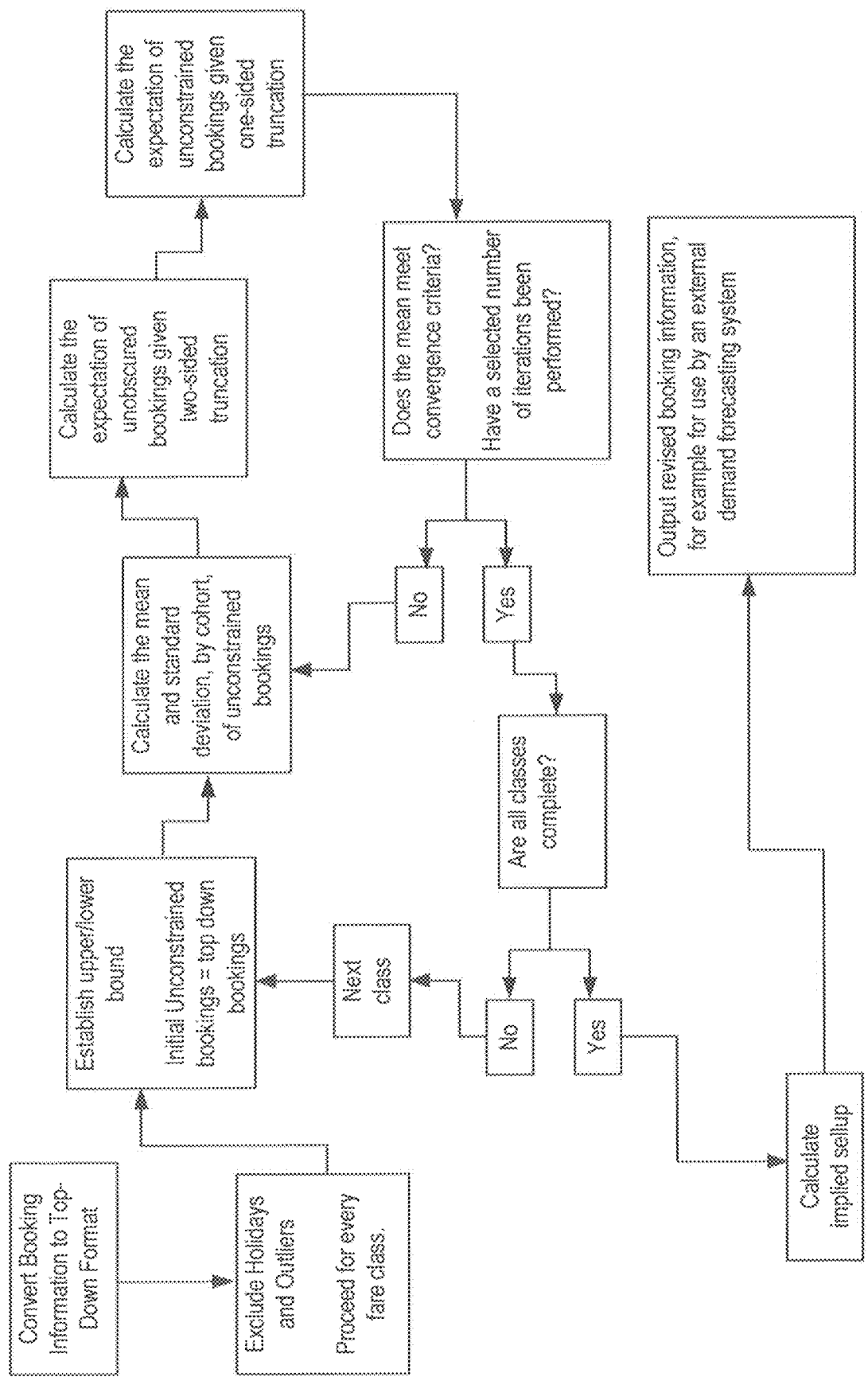
FIG. 2B illustrates an exemplary unobscuring and unconstraining method in accordance with various embodiments.

With reference now to FIGS. 2A and 2B, in accordance with various embodiments, unobscuring module 146 is configured to implement a method 200 for unobscuring demand. In method 200, unobscuring module 146 may operate class-by-class, for example from the lowest price class through the highest price class, in order to provide a revised demand forecast and/or unobscured booking information useable to reduce and/or minimize forecasting errors associated with obscured demand.

Unobscuring module 146 and/or method 200 may be utilized on any suitable time schedule, as desired. For example, unobscuring module 146 may be operable on a weekly basis, on a daily basis, on an hourly basis, on a "triggered" basis (for example, each time a trigger event occurs, such as a booking or series of bookings), after collection of data associated with a DCP, and/or the like.

In various embodiments, and with reference to FIG. 2A, in method 200 booking information for a particular flight is converted into top-down format (step 210). Beginning with the lowest fare class as the "current class", the mean and standard deviation of top-down bookings in the current class is computed (step 220). In various exemplary embodiments, statistical information from the cohort to which the particular flight belongs is used to generate the mean and standard deviation of top-down bookings in the current class. A normal distribution may initially be assumed; however, other suitable distributions may also be utilized. If the current class is obscured, a suitable estimation algorithm, for example an expectation maximization (EM) algorithm 235 (not shown in the figures), is applied in an iterative fashion to calculate an unobscured demand for the current class (step 230). In various embodiments, EM algorithm 235 comprises an algorithm identical or substantially equivalent to:

$$E(X \mid a < X < b) = \mu + \frac{\phi\left(\frac{a-\mu}{\sigma}\right) - \phi\left(\frac{b-\mu}{\sigma}\right)}{\Phi\left(\frac{b-\mu}{\sigma}\right) - \Phi\left(\frac{a-\mu}{\sigma}\right)} \sigma$$

In an exemplary embodiment, EM algorithm 235 may be written in a non-normalized form as: expBkgs=mean+ (stdev*stdev)*(pdfLower−pdfUpper)/(cdfUpper−cdfLower); where:

expBkgs is the expectation of bookings in the current class; i.e. the unobscured bookings;
upperBound is the upper bound of the unobscured bookings in the current class, which may be equivalent to the unobscured bookings in the child class;
lowerBound is the lower bound of the unobscured bookings in the current class, which may be equivalent to the actual top-down cumulative bookings taken in the current class;
mean: the mean of the bookings (unobscured, unconstrained, and/or unobscured and unconstrained) for the current class in the appropriate cohort to which the current flight belongs;
stdev: the standard deviation of the bookings (unobscured, unconstrained, and/or unobscured and unconstrained) for the current class in the appropriate cohort to which the current flight belongs;
cdfUpper is the cumulative distribution function of the upper bound;
cdfLower is the cumulative distribution function of the lower bound;
pdfUpper is the probability density function of the upper bound; and
pdfLower is the probability density function of the lower bound.

In various embodiments, in method 200 the unobscured demand for the current class is used as the upper bound for unobscured demand for the parent class. The process is repeated for each parent class (step 240) until the unobscured demand for the highest fare class is obtained.

Because airline seats are booked on an integer basis (i.e. a partial seat booking is not possible), the unobscured demand values may be rounded or otherwise converted into discrete values (step 250); however, it will be appreciated that (i) when unobscuring module 146 is utilized in connection with other systems configured to accept fractional demand values, and/or (ii) when unobscuring module 146 is utilized in connection with demand forecasting associated with products and/or services amendable to fractional demand modeling, step 250 may be omitted. An updated demand forecast and/or unobscured booking information is generated (step 260).

In various exemplary embodiments, statistical information from a cohort or cohorts to which the current flight belongs may be utilized in unobscuring module 146 and/or method 200. A cohort may comprise any suitable number of flights; moreover, any suitable amount of historical data for the cohort may be utilized. In various exemplary embodiments, a cohort comprises between about 25 flights and about 75 flights. In one exemplary embodiment, a cohort comprises 50 flights. In various exemplary embodiments, between one month of historical information and two years of historical information (or 3+ years of historical information, for seasonal effects) may be utilized to conduct statistical assessments of the cohort. In one exemplary embodiment, 52 weeks of historical information are utilized to make a statistical assessment of the cohort.

With continued reference to FIG. 2B, method 200 may be applied to the exemplary booking data for Flight 244 provided in Table 1C. For each fare class, it is known that the minimum demand in that fare class is the top-down value of bookings in that class. Accordingly, with respect to the lowest fare class, R class, the lower bound on demand is the observed topdown bookings (i.e., 8). The upper bound is based on the class below class R (i.e., the child class). However, because class R is the lowest fare class, it has no child class, so the expected demand for R class, $DEM_R$, is bounded as follows: $8 \leq DEM_R \leq 8$. Moving up to the parent class of class R, class E, $DEM_R$ becomes the new upper bound for $DEM_E$. Therefore, $8 \leq DEM_E \leq 8$. Classes U and K follow in similar fashion.

Figure 2C:
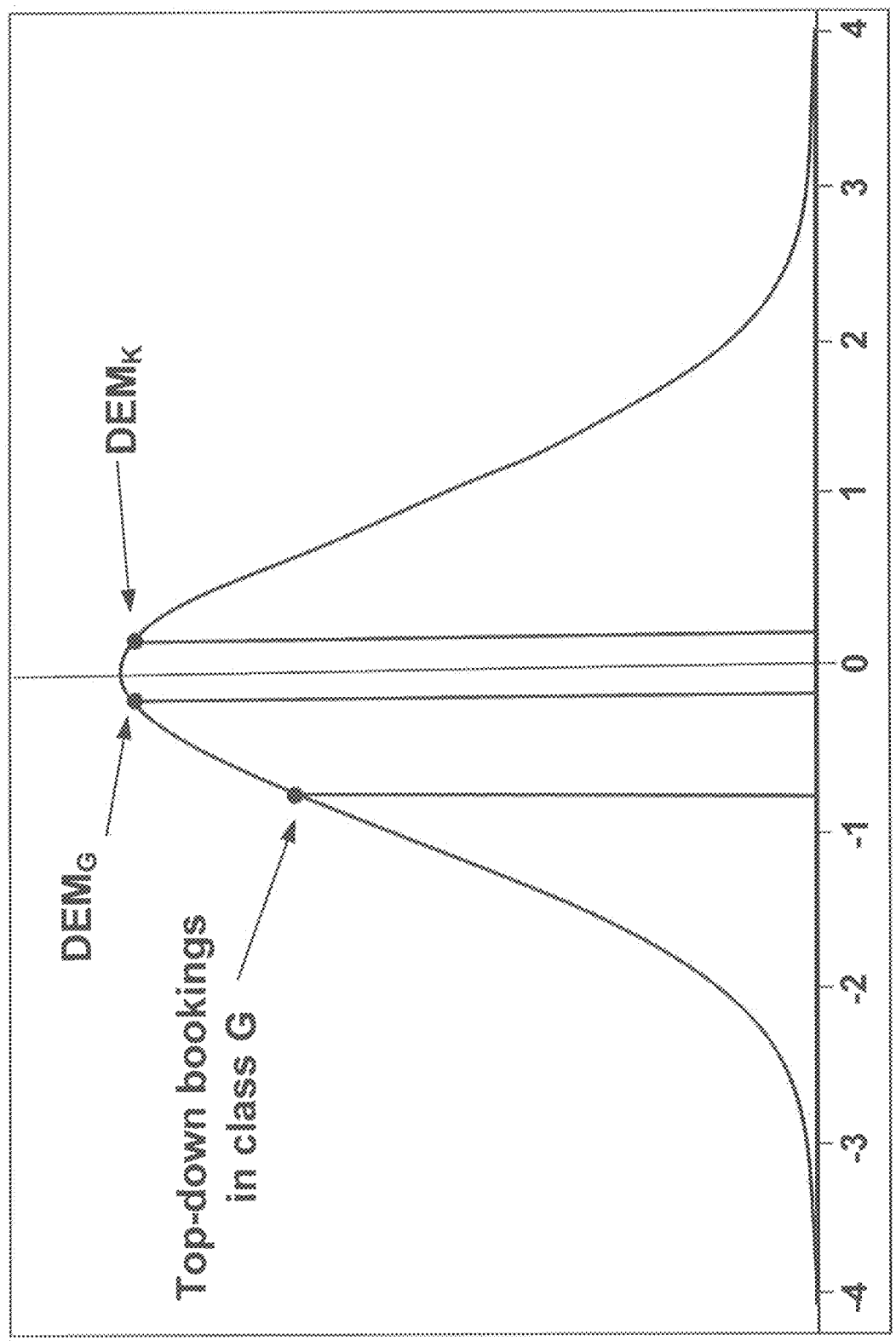
FIG. 2C illustrates the result of an exemplary unobscuring method in accordance with various embodiments.

In this example, G class is the first class for which demand is considered to be obscured. Here, $4 \leq DEM_G \leq 8$. The lower bound, 4, is the observed topdown bookings in class G; the upper bound, 8, is $DEM_K$, the expected demand in K class (the child class of class G). An EM algorithm may be utilized to solve for $DEM_G$, for example as illustrated in FIG. 2C.

Using an exemplary EM algorithm, for example an iterative algorithm applied until a convergent solution is reached, and using appropriate information from the cohort of the example flight, values for G class are calculated as follows: Mean=8.48, Std. Dev.=3.32, and $DEM_G$=6.28. Stated differently, when applied to our exemplary data for example Flight 244, method 200 predicts that in the current period, 6.28 persons would have booked in G class if K class seating had not been available. Repeating the process for each remaining class, using information from the cohort as appropriate, we obtain:

$4 \leq DEM_T \leq 6.28$; Mean=8.09, Std. Dev.=3.11, and $DEM_T$=5.27.
$3 \leq DEM_S \leq 5.27$; Mean=6.58, Std. Dev.=2.84, and $DEM_S$=4.26.
$3 \leq DEM_L \leq 4.46$; Mean=3.46, Std. Dev.=1.33, and $DEM_L$=3.62.
$3 \leq DEM_W \leq 3.62$; Mean=3.13, Std. Dev.=1.54, and $DEM_W$=3.31.
$0 \leq DEM_V \leq 3.31$; Mean=0.67, Std. Dev.=0.30, and $DEM_V$=0.67.
$0 \leq DEM_N \leq 0.67$; Mean=0.09, Std. Dev.=0.03, and $DEM_N$=0.10.

At this point, it will be appreciated that while the process may continue for each higher fare class (i.e., class Q), the process may also be terminated at this point, as the expected demand for all higher fare classes is approximately zero.

The expected demand values generated above for each fare class may be converted into integers, for example via simple rounding. Other suitable integer conversion approaches may be utilized. The results of simple rounding are shown in Table 1D:

TABLE 1D

| Fare Class | Expected Demand (Top-Down) | Expected Demand, Rounded (Top-Down) |
|---|---|---|
| Q | N/A | 0 |
| N | 0.10 | 0 |
| V | 0.67 | 1 |
| W | 3.31 | 3 |
| L | 3.62 | 4 |
| S | 4.26 | 4 |
| T | 5.27 | 5 |
| G | 6.28 | 6 |
| K | 8.00 | 8 |
| U | 8.00 | 8 |
| E | 8.00 | 8 |
| R | 8.00 | 8 |

To eliminate double counting, the expected demand values may be converted out of top-down format into a discrete format. Additionally, each booking represented in the expected demand may be allocated to any suitable fare class; however, in various embodiments each booking is allocated to the highest fare class that can claim it, as shown in Table 1E:

TABLE 1E

| Fare Class | Expected Demand, Rounded (Top-Down) | Expected Demand, Discrete |
|---|---|---|
| Q | 0 | 0 |
| N | 0 | 0 |
| V | 1 | 1 |
| W | 3 | 2 |
| L | 4 | 1 |
| S | 4 | 0 |
| T | 5 | 1 |
| G | 6 | 1 |
| K | 8 | 2 |
| U | 8 | 0 |
| E | 8 | 0 |
| R | 8 | 0 |

Continuing with the example data at DCP 19 for exemplary Flight 244, the expected or "unobscured" demand for all fare classes may be compared to the actual bookings, as shown in Table 1F:

TABLE 1F

| Fare Class | New Bookings (Actual) | Expected Demand (Discrete) | Difference, Actual to Expected |
|---|---|---|---|
| Q | 0 | 0 | 0 |
| N | 0 | 0 | 0 |
| V | 0 | 1 | +1 |
| W | 3 | 2 | −1 |
| L | 0 | 1 | +1 |
| S | 0 | 0 | 0 |
| T | 1 | 1 | 0 |
| G | 0 | 1 | +1 |

TABLE 1F-continued

| Fare Class | New Bookings (Actual) | Expected Demand (Discrete) | Difference, Actual to Expected |
|---|---|---|---|
| K | 4 | 2 | −2 |
| U | 0 | 0 | 0 |
| E | 0 | 0 | 0 |
| R | 0 | 0 | 0 |

In various embodiments, the expected demand information output by method 200 and/or unobscuring module 146 may be combined with previously calculated expected demand information (for example, expected demand information calculated for a prior DCP and/or multiple prior DCPs) and/or with prior actual booking information, and the combined demand information may be utilized as an input into an external forecasting system. It will be appreciated that in instances when a flight is only partially booked (i.e., when many seats on a flight remain open), the output of unobscuring module 146 may result in only minor revisions and/or updates to a demand forecast, a seat protection strategy, and/or the like; however, when supply and demand levels are close to one another (or when demand exceeds supply), the output of unobscuring module 146 may result in significant changes to a demand forecast, a seat protection strategy, and/or the like.

Unobscuring module 146 (and/or method 200) may also be configured to utilize weighting factors (for example, seasonal adjustments, and/or the like) to further refine demand estimates. Additionally, booking information for holidays or other unusual dates may be considered to be outliers, and associated booking information may be ignored and/or minimally weighted in unobscuring module 146 and/or method 200.

In additional exemplary embodiments, unobscuring module 146 may take additional passenger information factors into account, for example passenger name record ("PNR") characteristics. Based at least in part on PNR characteristics, unobscuring module 146 may estimate how likely a particular passenger is to "buy down" when booking a seat, and the likelihood of buy-down may be utilized to refine and/or modify the output of unobscuring module 146.

Via use of unobscuring module 146 and/or method 200, demand may be more accurately forecasted. Consequently, improved fare class opening/closing decisions may be made.

In addition to utilizing unobscuring module 146, forecasting system 115 may be configured to utilize unconstraining module 147 (and/or method 300) to create, revise, and/or modify demand forecasts and/or to generate unconstrained demand information. Stated generally, unconstraining module 147 is configured to provide an answer to the question: "How many bookings would have been taken if a particular fare class $F_{NEW}$ was opened?"

Often, a fare class $F_{NEW}$ is opened partway through the current period, for example the period of time between a first DCP and a second DCP (or other interval of time over which statistical assessment is desirable). Stated another way, often a newly opened fare class $F_{NEW}$ was open for bookings for only a portion of a time period for which booking information is available. It will be appreciated that therefore, there is at least a possibility that additional bookings would have been realized in class $F_{NEW}$ if class $F_{NEW}$ was open for bookings for the entirety of the current period. Because a potential exists for denied bookings in class $F_{NEW}$, class $F_{NEW}$ may be considered to be "constrained". Accordingly, the number of bookings that might have been realized in class $F_{NEW}$ is not readily apparent.

Figure 3A:
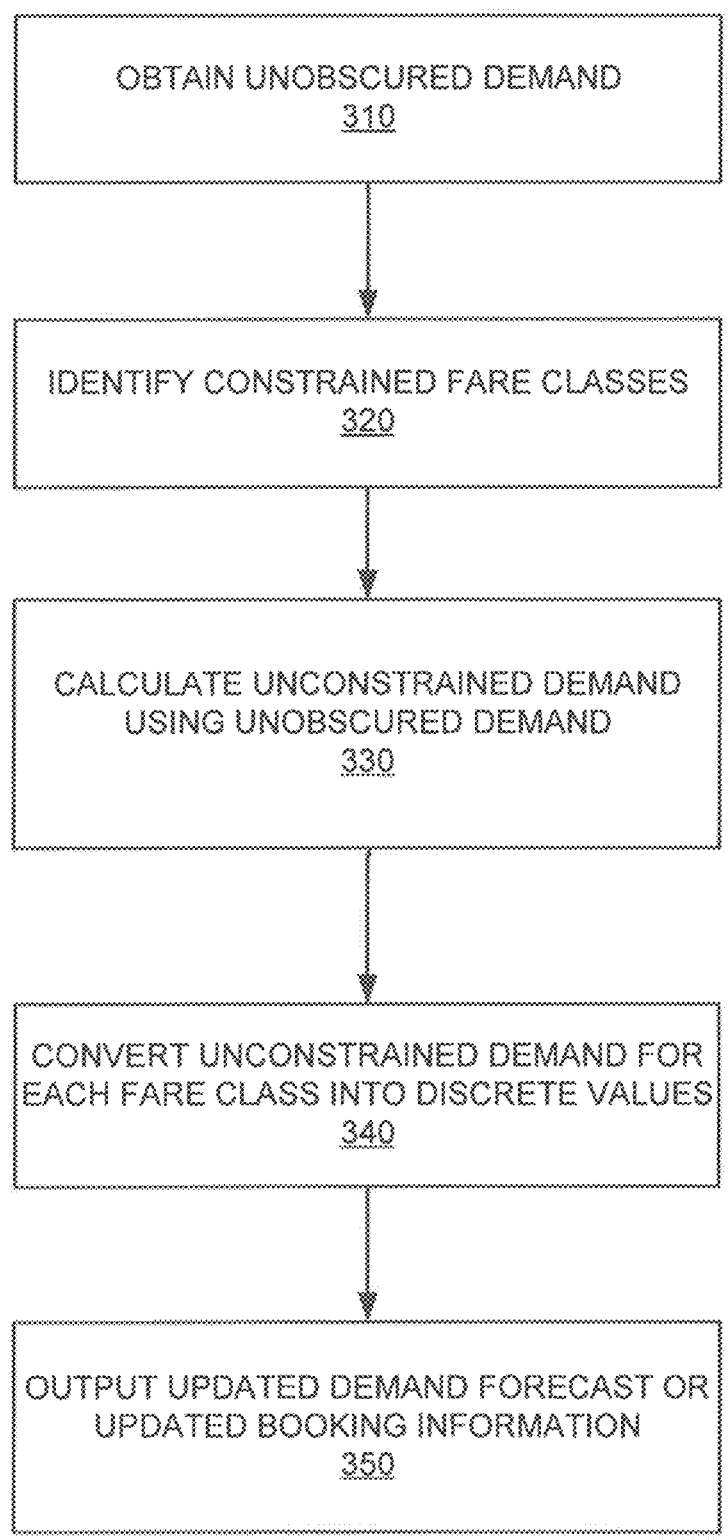
FIG. 3A illustrates an exemplary unconstraining method in accordance with various embodiments.

In various exemplary embodiments, and with reference now to FIGS. 1A and 3A, to address this issue unconstraining module 147 is configured to utilize method 300 to obtain unconstrained demand information, for example unconstrained demand information associated with a particular flight. In various embodiments, unconstraining module 147 is configured to generate predicted booking information that differs from actual observed bookings. In certain exemplary embodiments, unconstraining module 147 generates demand forecasts directly; in other exemplary embodiments, predicted booking information generated by unconstraining module 147 may be delivered to other electronic systems (for example, PROS) in lieu of actual observed booking information, in order to generate improved demand forecasts.

Unconstraining module 147 and/or method 300 may be utilized on any suitable time schedule, as desired. For example, unconstraining module 147 may be operable on a weekly basis, on a daily basis, on an hourly basis, on a "triggered" basis (for example, each time a trigger event occurs, such as a booking or series of bookings), after collection of data associated with a DCP, and/or the like. In various embodiments, unconstraining module 147 is operable subsequent to operation of unobscuring module 146.

With reference now to FIG. 3A, in various embodiments, in method 300 an unobscured booking table containing unobscured demand information is utilized as an input (step 310). Constrained fare classes are identified (step 320). For each constrained fare class, the corresponding unobscured demand information is converted to unconstrained demand information (step 330), for example by utilizing statistical information from the cohort to which the current flight belongs. In various exemplary embodiments, the statistical information from the cohort comprises an evaluation of a data set of truncated histories (i.e., historical information for previous constrained and unconstrained classes in the cohort); stated another way, the statistical information from the cohort comprises a comparison of the current constrained fare class to overall statistical information for the current fare class in the cohort as a whole.

Because airline seats are booked on an integer basis (i.e, a partial seat booking is not possible), the unconstrained demand information may be rounded or otherwise converted into discrete values (step 340); however, it will be appreciated that (i) when unconstraining module 147 is utilized in connection with other systems configured to accept fractional demand values, and/or (ii) when unconstraining module 147 is utilized in connection with demand forecasting associated with products and/or services amendable to fractional demand modeling, step 340 may be omitted. An updated demand forecast and/or unconstrained booking table is generated (step 350).

Unconstraining module 147 (and/or method 300) may also be configured to utilize weighting factors (for example, seasonal adjustments, and/or the like) to further refine demand estimates. Additionally, booking information for holidays or other unusual dates may be considered to be outliers, and associated booking information may be ignored and/or minimally weighted in unconstraining module 147 and/or method 300.

Principles of operation of unconstraining module 147 and/or method 300 are illustrated in the example bookings shown in Table 3A. Table 3A illustrates new bookings for an example Flight 344, which received 10 new bookings over a particular interval, for example the time between a first DCP and a second DCP:

TABLE 3A

New Bookings for Flight 344 in the Current Period

| Fare Class | New Bookings | New Bookings (Top-Down) |
|---|---|---|
| S | 0 | 0 |
| T | 1 | 1 |
| G | 3 | 4 |
| K | 4 | 8 |
| U | 2 | 10 |
| E | 0 | 10 |
| R | 0 | 10 |

In the example illustrated in Table 3A, fare classes K, U, E, and R were opened for bookings partway through the current period (i.e., classes K,U,E,R, were closed for bookings for at least part of the current period). Classes K, U, E, R, are shown as underlined in Table 3A to illustrate that these fare classes were opened during the current period.

For this example, it can be seen that if classes U, E, and R were open for the entire current period, at least 10 bookings would have occurred. Additionally, if classes U, E, and R, were not opened, the two bookings that occurred in class U might have occurred in class K (however, it is also possible that only one, or none, might have occurred). Accordingly, class K may be considered to be obscured as discussed hereinabove. Additionally, because class K was open for bookings for only a portion of the current period, class K is also considered to be "constrained".

In accordance with principles of the present disclosure, unobscuring module 146 may be utilized to determine the unobscured demand for an obscured fare class or classes in this example, such as unobscured demand $DEM_K$ for class K. In accordance with unobscuring principles disclosed hereinabove, it can be seen that $8 \leq DEM_K \leq 10$. Via use of unobscuring module 146, $DEM_K$ is determined to be 9.05.

Figure 3B:
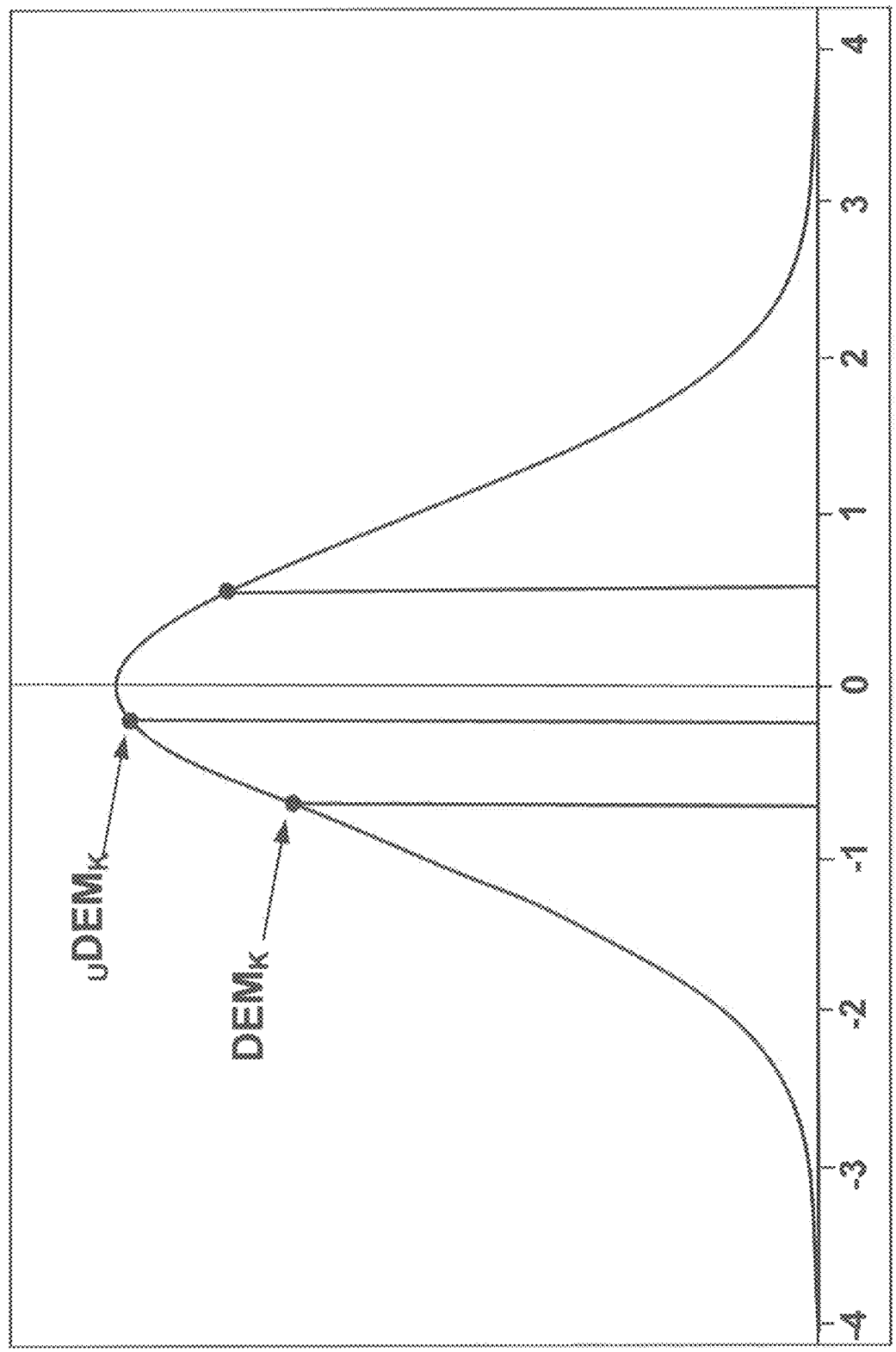
FIG. 3B illustrates the result of an exemplary unconstraining method in accordance with various embodiments.

Because example class K was opened for bookings during the current period, class K is constrained. Unobscured demand $DEM_K$ (in fractional or integer form) is utilized as an input to unconstraining module 147 and/or method 300 to obtain unconstrained and unobscured demand $_UDEM_K$ for class K. Via operation of unconstraining module 147, $_UDEM_K$ is determined to be 10.66, for example as illustrated in FIG. 3B. Stated another way, class K would have been expected to receive 10.66 bookings if class K had been open for bookings for the entire current period. A similar approach may be employed to determine $_UDEM_U$, and similar demand forecasting inferences may be drawn therefrom.

In various embodiments, through use of unobscuring module 146 and/or unconstraining module 147, airlines may implement revisions to their booking strategies. In many instances, airlines may take more bookings on marginal flights and/or lower revenue seats than before. Stated differently, after assessing the improved estimated demand information provided and/or facilitated by unobscuring module 146 and/or unconstraining module 147, airlines may protect fewer upper-class seats, and more bookings in lower classes are thus made. However, the resulting bookings are typically made in fare classes that are higher than would have resulted if forecasts were based on historical demand alone and/or based on the presumption of fare class demand independence. This is because, after assessment of the improved estimated demand information, buy-down risk in higher classes is better known. Additional seats are thus booked in a manner that is revenue-positive for the airline, as (i) seats previously left empty are occupied, and (ii) buy-down is reduced.

In addition to unobscuring principles and/or unconstraining principles as disclosed hereinabove, forecasting system 115 may be configured to utilize fare adjustment module 148. Fare adjustment module 148 is configured to provide insight into the demand relationships between one or more fare classes. Fare adjustment module 148 can thus be utilized to determine under what conditions opening a new, lower fare class is a revenue positive decision.

Prior demand forecasting approaches often assumed independence of demand; in other words, prior approaches often assumed 0% buy down. In contrast, principles of the present disclosure contemplate demand forecasting approaches and/or fare adjustment approaches that recognize that certain passengers may be "product oriented" (i.e., passengers who will purchase in a higher fare class than the lowest available), while certain other passengers may be "price oriented" (i.e., passengers who will buy down, if given the opportunity to do so).

Because not all passengers are product oriented, and not all passengers are price oriented, opening a new, lower fare class $F_L$ has at least 2 effects. First, "stimulation". Stimulation refers to revenue arising from and/or represented by new bookings that would not have occurred if class $F_L$ had not been opened. Second, a "dilution penalty" or simply "dilution". Dilution refers to the negative revenue consequences arising from and/or represented by bookings that were bought down in class $F_L$, but which would have been purchased in a higher class if class $F_L$ was not open. Stated generally, fare adjustment module 148 may be utilized to evaluate if, for a particular set of circumstances, the stimulation of opening class $F_L$ exceeds the dilution arising from opening of class $F_L$—and thus, whether opening class $F_L$ is a revenue positive decision.

Prior approaches often considered only the effects of stimulation, and did not consider dilution; accordingly, prior approaches often led to class opening decisions that were revenue negative.

It will be appreciated that the ratio of product-oriented passengers (or product-oriented demand) to price-oriented passengers (or price-oriented demand) has a significant effect on fare adjustments. In fare adjustment module 148, "buy-down percent" may be considered to be the percentage of passengers for which demand is price-oriented. Fare adjustment module 148 may identify, for a particular set of bookings, the associated demand orientation.

Figure 4A:
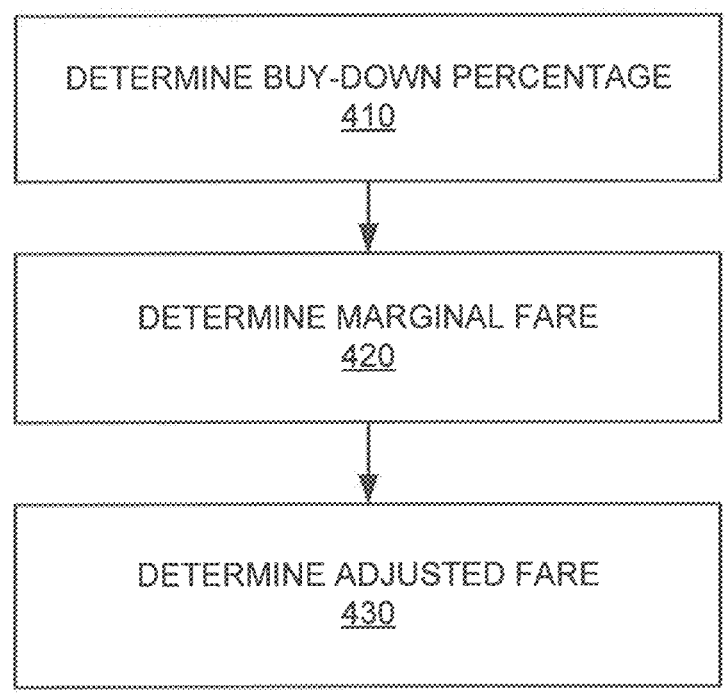
FIG. 4A illustrates an exemplary fare adjustment method in accordance with various embodiments.
Figure 4B:
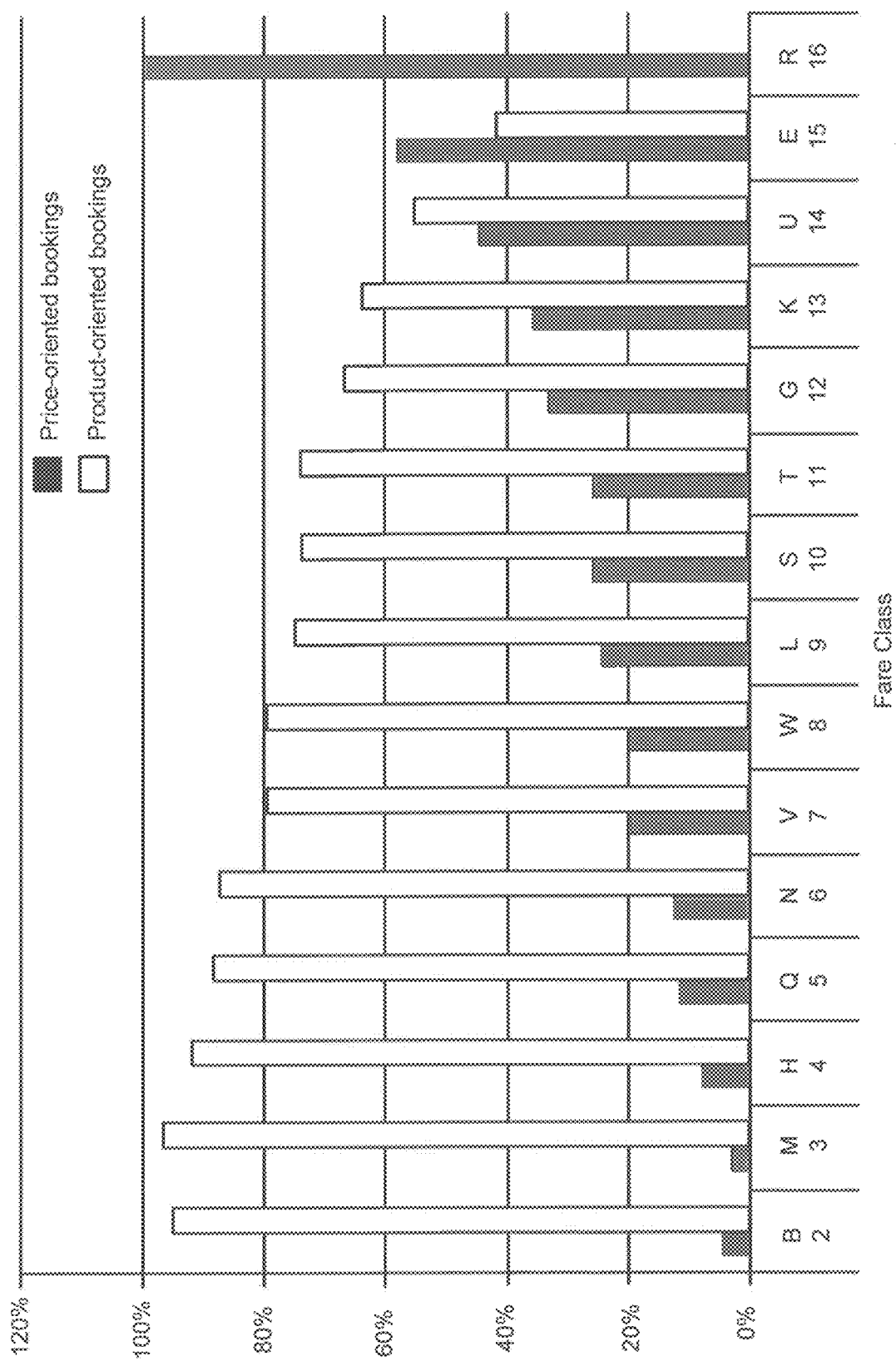
FIG. 4B illustrates a chart of exemplary price-oriented bookings and product-oriented bookings in a bookings table in accordance with various embodiments.

In various embodiments, fare adjustment module 148 is configured to consider certain bookings (for example, bookings that were revised and/or restated as a result of operation of unobscuring module 146) to be price-oriented bookings, as these bookings have already demonstrated buy-down. Certain other bookings may be determined to be price-oriented, for example based on customer purchase history or other historical data. Bookings which are not determined to be price oriented may be considered to be product-oriented. An illustration of exemplary ratios of price-oriented demand vs. product-oriented demand for a series of fare classes on a particular flight is illustrated in FIG. 4B. Stated generally, the proportion of demand for a fare class that is product-oriented demand tends to increase as the expense of the fare class increases; conversely, the proportion of demand for a fare class that is price-oriented demand tends to increase as the expense decreases.

In various embodiments, fare adjustment module 148 is configured to utilize fare adjustment method 400. With reference now to FIG. 4A, in one embodiment fare adjustment method 400 comprises determining a buy-down percentage (step 410), determining a marginal fare (step 420), and determining an adjusted fare (step 430).

In fare adjustment method 400, using restated bookings information from unobscuring module 146, a buy-down percentage BD % may be calculated as follows: the ratio of historical bookings in classes higher than the current class that were booked in the lowest available class, or were moved "up" to a higher fare class via unobscuring, to the total number of historical bookings in classes higher than the current class. It will be appreciated that a buy-down percentage may be calculated for a flight or group of flights, for example based on one or more common characteristics of a group of flights. Moreover, BD % may be considered to be the percent of bookings that are price-oriented bookings.

In fare adjustment method 400, a marginal fare MF may be determined as follows: MF=(average fare*probability (seat purchased by current class))+(LOSS*probability(seat purchased by higher class)), where:
  LOSS is the difference in revenue per booking between the current class and the parent class (i.e., the average fare of current class minus the average fare of the parent class);
  probability(seat purchased by current class)=the demand (current class), divided by the demand (current class and all higher classes); and
  probability(seat purchased by higher class)=1 minus the probability(seat purchased by current class); the marginal fare calculation may utilize forward looking demand for a flight or group of flights.

In fare adjustment method 400, determining an adjusted fare may be implemented as follows: an adjusted fare AdjF for a particular class may be equal to (BD %*MF)+(1−BD %)*AF), where AF is the average fare in the class. It will be appreciated that AdjF may be obtained based at least in part on a weighted average of average fare and marginal fare based on buy-down.

In various embodiments, fare adjustment module 148 makes an initial assessment configured to assume 100% buy down. In other words, if a lower class is opened, everyone from higher classes will buy down to D. This is illustrated by example in Table 4A. In Table 4A, demand for seats on a hypothetical flight having 125 seats is assumed to be deterministic, as shown:

TABLE 4A

| Fare Class | Average Fare | Demand | Cumulative/ Top-Down Demand | Total Revenue | Incremental Revenue Arising from Having the Class Open |
|---|---|---|---|---|---|
| A | $400 | 10 | 10 | $ 4,000 | $4,000 |
| B | $300 | 25 | 35 | $10,500 | $6,500 |
| C | $200 | 40 | 75 | $15,000 | $4,500 |
| D | $100 | 50 | 125 | $12,500 | ($2,500) |

When modeled in this manner, it is apparent that having class D open is not a revenue positive decision; the true value of each booking in class D (i.e., the marginal fare) is equal to ($2500)/125=($20), a loss of twenty dollars.

In accordance with various embodiments, fare adjustment module 148 is configured to utilize expected marginal seat revenue (EMSR) information, for example EMSR information for each seat in a fare class, in order to determine whether to open a particular fare class, assign seat protects to a particular fare class, and/or the like.

In various embodiments, fare adjustment module 148 is configured to assign seat protects via a "partitioned"

approach. In a partitioned approach, seat protects are assigned based on the class of the EMSR. In other exemplary embodiments, fare adjustment module 148 is configured to assign seat protects via a "nested" approach. In a nested approach, seat protects are assigned based on the value of the EMSR.

A partitioned approach may calculate the EMSR for a seat based at least in part on the demand forecast and the average fare for each class. A nested approach may calculate the EMSR based on the demand forecast and the average fare of a given class, or based on the joint demand forecast and the joint average fare of a given class and all higher classes.

By way of example, fare adjustment module 148 may consider a hypothetical situation wherein 1 seat protect must be allocated. In this hypothetical situation, the seat protect is in B class, which is determined to have a 20% chance of booking, and a $900 average fare. The EMSR for this seat is $900*0.2=$180, which, in this example, is the highest EMSR remaining for any open seat in any fare class.

When fare adjustment module 148 employs a partitioned approach, the seat protect is assigned to B class, which is the class used in the EMSR calculation. An advantage of the partitioned approach is it holds out for the potential higher value seat booking, thus combatting spiral down. However, because the chance of booking the seat is somewhat low (i.e., only 20%), the degree to which spiral down is reduced may be small. Moreover, a potential downside of the partitioned approach is the seat protect in B class will cause potential bookings in lower classes to be rejected, even if those potential bookings have a higher actual value than the EMSR of $180 for this B class seat.

Continuing with this example, when fare adjustment module 148 employs a nested approach, the seat protect is assigned to D class (which is the class having a value equal to the EMSR value of $180) rather than to B class, which has a value of $900. The nested approach ensures that any booking having a value higher than the probabilistic value of the protected seat will be accepted. However, the nested approach does not take dilution into account; the forecasted class B customer might purchase in class D instead (i.e., the customer might buy down).

In order to address the potential downsides and/or shortcomings illustrated by the foregoing examples, in various embodiments fare adjustment module 148 is configured to account for, estimate, and/or otherwise model or respond to dilution.

In a further example shown in Table 4B, operation of fare adjustment module 148 is illustrated.

Figure 4C:
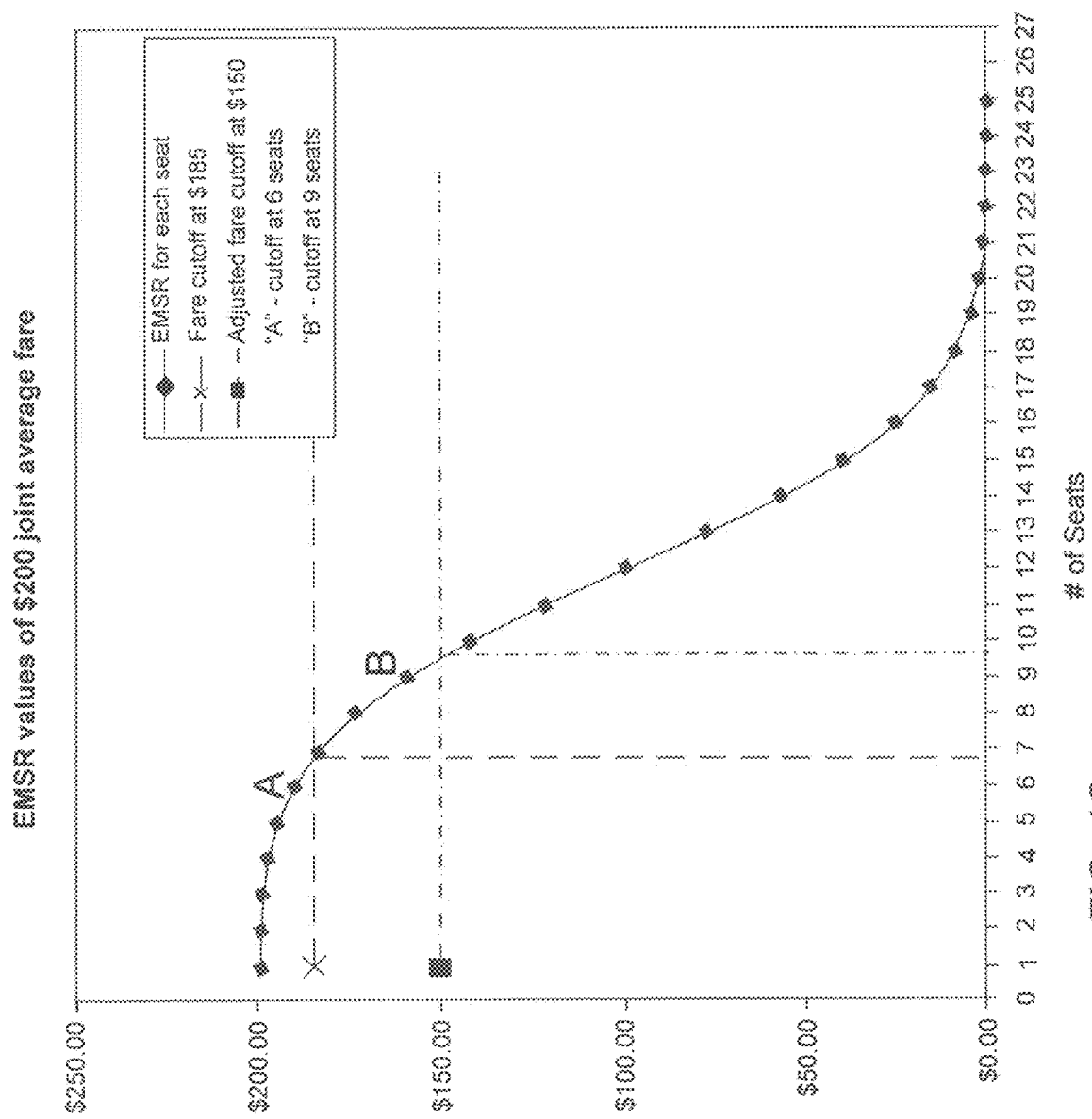
FIG. 4C illustrates seat allocation in a fare class in accordance with an exemplary fare adjustment method, in accordance with various embodiments.

In various embodiments, in connection with operation of fare adjustment module 148 and/or forecasting system 115, a seat allocation system is utilized to allocate seats in a class until the joint EMSR value falls below the average fare of the child class. Fare adjustment module 148 may be utilized to modify the seat allocation process for a particular class to account for dilution if a child class is open. After utilization of fare adjustment module 148, a seat allocation system may allocate seats in a class until the joint EMSR value falls below the adjusted average fare of the child class. With reference now to FIG. 4C, it can be seen that, responsive to operation of fare adjustment module 148, a seat allocation system may assign more seats to a particular class than would otherwise be assigned; stated differently, a seat allocation system may assign more seats to the current class and fewer seats to a child class.

For example, in a particular example instance illustrated in FIG. 4C, absent operation of fare adjustment module 148, only six seats would be allocated to the current fare class (shown at point A in FIG. 4C). In contrast, responsive to operation of fare adjustment module 148, nine seats are allocated to the current fare class (shown at point B in FIG. 4C). In other words, three additional seats that would otherwise have been allocated to a child class are instead allocated to the current class. In this manner, because additional seats are allocated to the current class and fewer seats are thus available for allocation to a child class, the risk of future buy-down is reduced. In sum, fare adjustment module 148 enables proper valuation of a child class as compared to the parent class, accounting for both stimulation and dilution.

It will be appreciated that if all passengers were product oriented, prior approaches which presumed independence of demand would be accurate; however, because all passengers are not product oriented, fare adjustment module 148 may be utilized to better quantify the revenue effects of opening a particular fare class for bookings. Moreover, it will be appreciated that fare adjustment module 148 may not necessarily be utilized to set availability or fares for a particular fare class. Rather, fare adjustment module 148 may typically be utilized to determine the true value of the child class for purposes of comparison to the parent class. Revised and/or updated solutions may be generated based at least in part on the output of fare adjustment module 148. Such updated solutions may be utilized by other systems, for example a revenue management system, to set and/or revise actual fare class seat prices for public sale. Moreover, in various exemplary embodiments, the output of fare adjustment

TABLE 4B

| Fare Class | Average Fare | Demand | Cumulative/ Top-Down Demand | Loss if Seat Purchased by higher class | Probability seat purchased by current class | Probability seat purchased by higher class | Expected value accounting for dilution |
|---|---|---|---|---|---|---|---|
| A | $300 | 5 | 5 | N/A | 100% | 0% | $300 |
| B | $200 | 15 | 20 | −$100 | 75% (15/20) | 25% | $125 |
| C | $100 | 30 | 50 | −$100 | 60% (30/50) | 40% | $ 20 |
| D | $ 40 | 50 | 100 | −$60− | 50% (50/100) | 50% | −$ 10 |

In the example scenario illustrated in Table 4B, fare adjustment module 148 determines that having class D open is not a revenue positive decision. Stated differently, the true value of a class D booking (the marginal fare) is the expected value received from a class D booking when class D is open: marginal fare=$40*(50/100)+(−$60)*(50/100)=$−10. As can be seen, a class D booking results in: $40*(50/100)=$20 of "stimulus", and (−$60)*(50/100)=−$30 in "dilution".

module 148 may be utilized as an input to other electronic systems (for example, PROS), for example in order to refine and/or revise a demand forecast and/or optimization.

In addition to fare adjustment principles, unobscuring principles, and/or unconstraining principles as disclosed hereinabove, forecasting system 115 may be configured to utilize prime class remapping (PCR) module 149. In various exemplary embodiments, PCR module 149 is configured to allocate prime class bookings to fare classes in a manner that results in positive revenue consequences (or reduces and/or minimizes negative revenue consequences).

Typically, airlines have at least one fare class (referred to herein as a "prime class") that is given priority over all (or some) other fare classes. Certain prime class contracts also require last seat availability. Because prime class bookings often occur close to a flight departure date, prime class bookings often displace high-revenue fare class bookings. However, prime class bookings are often associated with a revenue amount that is inconsistent with the position they occupy in the class hierarchy. Stated another way, prime class bookings often result in zero additional revenue (for example, prime class bookings arising from use of mileage rewards programs, such as high-priority double mileage redemptions) or minimal additional revenue (certain government and/or corporate bookings), but have high priority. In general, because prime class bookings have a lower average fare than most fare classes, protecting seats for prime class bookings at the expense of other revenue bookings has a negative impact on airline revenue. Prime class bookings have high priority, but highly variable revenue; accordingly, while airlines are often obligated to protect seats for prime class bookings, doing so typically has a negative effect on revenue.

Adding complexity to this problem, common forecasting tools in the airline industry are not configured to handle prime class forecasting; a typical approach is simply not to forecast prime class demand at all, but rather to assume prime class demand is zero. However, because prime class bookings commonly occupy from about 1% to about 3% of total bookings, ignoring demand for prime class bookings introduces forecasting errors, resulting, depending on the nature of the errors, in unnecessary buy-down and/or empty (spoiled) seats on a flight.

Turning now to FIG. 5, in accordance with various embodiments PCR module 149 is configured to implement a method 500 for prime class remapping. Stated generally, PCR module 149 is configured to provide an improved answer to the question: "What is the value of a particular prime class booking?"

In various embodiments, PCR module 149 is configured to treat a prime class booking as if it were a booking of an equivalent revenue class or higher class. Stated differently, PCR module 149 is configured for "remapping" of prime class bookings into other fare classes, for example for purposes of demand forecasting, seat protection, and/or the like.

In various embodiments, prime class remapping method 500 utilizes an average fare for prime class bookings. In other exemplary embodiments, method 500 utilizes a known fare for each prime class booking. In certain exemplary embodiments, method 500 employs a hybrid approach, wherein certain prime class bookings are considered to represent an average prime class fare, and certain other prime class bookings are considered to represent a known prime class fare (which may be higher or lower than the average).

PCR module 149 and/or method 500 may be utilized on any suitable time schedule, as desired. For example, PCR module 149 may be operable after collection of data associated with a DCP, on a weekly basis, on a daily basis, on an hourly basis, on a "triggered" basis (for example, each time a trigger event occurs, such as a prime class booking), and/or the like.

In various embodiments, PCR module 149 identifies the net prime class bookings for a particular flight for the period in question (step 510), as follows: net prime class bookings=current prime class bookings—prior prime class bookings. For each net prime class booking, PCR module 149 identifies the fare class that is closest in value to the value (i.e., average or known) of that net prime class booking (step 520). This closest fare class may be referred to as the "floor class". However, for the flight in question, at the time of that prime class booking the floor class and/or higher fare classes may have been (or are) closed. If the floor class was or is closed, PCR module 149 identifies an alternative class, the "displacement class" (step 530). The displacement class is the lowest class that is both (i) higher than the floor class, and (ii) currently open for bookings. PCR module 149 "remaps" each prime class booking to its respective target class, which is the higher of the floor class and the displacement class for that prime class booking (step 540). PCR module 149 may also add the remapped net prime bookings to other booking information for the current period and/or prior period(s), for example in order to generate cumulative booking information for the current period (step 550). Additionally, if a previously booked prime class booking has been cancelled during the current period, PCR module 149 may "unmap" that prime class booking from the lowest fare class that had previously received any remapped prime class booking (step 560).

It will be appreciated that any suitable data inputs and/or information may be utilized by PCR module 149, for example historical booking information, estimated fare information for a prime class booking, actual fare information for a prime class booking, currently open fare classes for a flight, prior output of PCR module 149 for a prior time period, departure date information, market information, fare information, and/or the like.

Operation of PCR module 149 and/or method 500 may be illustrated in the example shown in Table 5A. For a particular example, for Flight 544 during a particular time period, 5 new prime class bookings are received. For 3 of the new prime class bookings (prime class bookings P1, P2, and P3), class K is the floor class; for the remaining 2 prime class bookings (P4 and P5), class L is the floor class. PCR module 149 remaps prime class bookings P1 through P3 into class T (the lowest open class higher than the floor class, class K, which is closed). PCR module 149 remaps prime class bookings P4 and P5 into class L. PCR module 149 outputs the updated remapped prime class booking information in the form of an updated bookings table. The updated bookings table may be used, for example, by other components of forecasting system 115, external system(s) 160, and/or the like.

TABLE 5A

| Fare Class | New Prime Class Bookings | Remapped Prime Class Bookings |
|---|---|---|
| Prime | 5 | N/A |
| Q | N/A | 0 |
| N | N/A | 0 |
| V | N/A | 0 |
| W | N/A | 0 |
| L | N/A | 2 |
| S | N/A | 0 |
| T | N/A | 3 |
| G (closed) | N/A | N/A |
| K (closed) | N/A | N/A |
| U (closed) | N/A | N/A |
| E (closed) | N/A | N/A |
| R (closed) | N/A | N/A |

Principles of operation of PCR module 149 and/or method 500 are further illustrated in the additional example represented in Table 5B. For a particular example Flight 544, during a particular time period, 3 prime class bookings are cancelled, i.e., "new" prime class bookings has the value −3. In this example, 10 prior prime class bookings had previously been remapped into fare classes T, S, L, W, and V, with 2 prime class bookings previously remapped into each class, respectively. −3 prime class bookings were received in the current period, so 2 previously remapped prime class bookings are "unmapped" from fare class T (the lowest fare class that had previously received prime class remapping). Fare class T now holds 0 remapped prime class bookings, so the 1 remaining prime class cancellation is allocated to fare class S (the next lowest fare class that had previously received prime class remapping). PCR module 149 outputs the updated remapped prime class booking information, for example for use by other components of forecasting system 115, external system(s) 160, and/or the like.

TABLE 5B

| Fare Class | "New" Prime Class Bookings | Previously Remapped Prime Class Bookings | Updated Remapped Prime Class Bookings |
|---|---|---|---|
| Prime | −3 | N/A | N/A |
| Q | N/A | 0 | 0 |
| N | N/A | 0 | 0 |
| V | N/A | 2 | 2 |
| W | N/A | 2 | 2 |
| L | N/A | 2 | 2 |
| S | N/A | 2 | 1 |
| T | N/A | 2 | 0 |
| G (closed) | N/A | N/A | N/A |
| K (closed) | N/A | N/A | N/A |
| U (closed) | N/A | N/A | N/A |
| E (closed) | N/A | N/A | N/A |
| R (closed) | N/A | N/A | N/A |

Via use of PCR module 149 and/or method 500, forecasting system 115 can better account for, modify, and/or forecast prime class demand. Additionally, because prime class bookings have been "remapped" to other fare classes that are suitable for use in external forecasting tools (for example, PROS), forecasting system 115 output may be utilized to incorporate prime class demand into an overall demand model for all fare classes for a particular flight. Via operation of PCR module 149 and/or method 500, forecasting system 115 is also enabled to reduce and/or prevent displacement of high value, late bookings by prime class bookings (which cannot be prevented from booking). Yet further, forecasting system 115 is enabled to more accurately account for the value of a particular prime class booking to an airline. In this manner, forecasting system 115 increases revenues (and/or decreases losses) associated with prime class bookings.

It will be appreciated that principles of the present disclosure associated with PCR module 149 and/or method 500 are not limited to prime class bookings. More generally, remapping approaches similar to those disclosed herein may suitably be employed to remap (and/or otherwise adjust and/or compensate for) any booking that is capable of being assigned to a fare class having a value that is higher than the value (actual or estimated) of that booking.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

For the sake of brevity, conventional data management, computer networking, statistical assessment, software application development, and other aspects of exemplary systems and methods (and components thereof) may not be described in detail herein. Furthermore, the connecting lines shown in the various figures contained herein are intended to represent functional relationships and/or physical or communicative couplings between the various elements. It should be noted that many alternative or additional functional relationships or physical connections may be present in a practical forecasting system.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that other interfaces may include mobile devices, kiosks and handheld devices such as mobile phones, smart phones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. A method comprising:
   determining, by a processor, which fare classes in a plurality of fare classes have demand that is obscured due to an availability of seats for booking in a lower fare class in the plurality of fare classes;
   calculating, by the processor iteratively executing an expectation maximization (EM) algorithm, an unobscured demand for a fare class in the plurality of fare classes;
   generating, by the processor with a demand forecasting system and using an unobscured bookings table, an unobscured demand forecast for a flight;
   storing, by the processor, the unobscured demand forecast in data tables;
   associating, by the processor, the unobscured demand forecast with the fare classes in the unobscured bookings table;
   using, by the processor, a key field in the unobscured bookings table to speed searches by simplifying the lookup and reducing in/out bottlenecks;
   tuning, by the processor, the unobscured bookings table to optimize database performance;
   placing, by the processor, frequently used indexes on separate file systems to further reduce the in/out bottlenecks;
   conducting, by the processor, sequential searches through the unobscured bookings table; and
   sorting, by the processor, records in the unobscured bookings table according to a known order to simplify lookup;
   obtaining, by the processor, the unobscured demand forecast from the data tables;
   opening, by the processor, an additional fare class on the flight for seat bookings, based on the unobscured demand forecast.

2. The method of claim 1, further comprising:
   converting, by the processor, the unobscured demand for the fare class into integer values representing the seat bookings in respective fare classes; and
   updating, by the processor, a bookings table with the integer values to form an unobscured bookings table.

3. The method of claim 1, wherein the plurality of fare classes are configured with parent-child relationships, and wherein, in the calculating the unobscured demand:
   the unobscured demand for a child class is used as the upper bound for the EM algorithm as applied to a parent class,
   top-down bookings for a class in question are used as the lower bound for the EM algorithm as applied to the parent class, and
   the EM algorithm is iteratively executed by the processor until a convergent solution for the unobscured demand is obtained for the fare class.

4. The method of claim 1, wherein the unobscured bookings table is formed from updating the bookings table with integer values.

5. The method of claim 1, further comprising combining, by the processor, an unobscured bookings table with an historical bookings table to form a revised historical bookings table.

6. The method of claim 1, wherein the unobscured demand forecast is used by at least one of a reservation system or a revenue management system to determine whether to open the additional fare class for the seat bookings.

7. The method of claim 1, wherein the determining the fare classes for which demand is obscured further comprises:
   converting, by the processor, a bookings table into a top-down format;
   identifying, by the processor, a lowest fare class for which the seat bookings were received in a first time period;
   identifying as an obscured class, by the first processor, a parent class of the lowest fare class for which bookings were received; and
   identifying as the obscured class, by the processor, the fare classes in the plurality of fare classes that are higher than the parent class of the lowest fare class for which the seat bookings were received.

8. The method of claim 3, wherein the EM algorithm comprises:
   expBkgs=mean+(stdev*stdev)*(pdfLower−pdfUpper)/(cdfUpper−cdfLower); where:
   the expBkgs is an expectation of the seat bookings in a current fare class known as unobscured seat bookings;
   an upperBound is an upper bound of the unobscured seat bookings in the current fare class;
   a lowerBound is a lower bound of the unobscured bookings in a current class;
   the mean is a mean of the seat bookings for the current fare class in a cohort to which the flight belongs;
   the stdev is a standard deviation of the seat bookings for the current fare class in the cohort to which the flight belongs;
   the cdfUpper is a cumulative distribution function of the upperBound;
   the cdfLower is a cumulative distribution function of the lowerBound;
   the pdfUpper is a probability density function of the upperBound; and
   the pdfLower is a probability density function of the lowerBound.

9. The method of claim 1, wherein the calculating the unobscured demand for the fare class is terminated upon determining, by the processor, that the unobscured demand for a current fare class rounds to zero.

10. The method of claim 1, further comprising weighting, by the processor, the unobscured demand for the fare class by a weighting parameter.

11. The method of claim 10, wherein the weighting parameter is determined based at least partially on a departure date of the flight.

12. The method of claim 10, wherein the weighting parameter is determined based at least partially on a departure date of the flight being a holiday or a weekend.

13. The method of claim 1, further comprising
   accessing, by the processor, a bookings table, wherein the bookings table further contains forecasted demand for the flight, and wherein the fare class in the plurality of fare classes is closed and contains none of the seat bookings;

determining, by the processor and using the seat bookings and the forecasted demand, a monetary stimulation value of opening a closed class;

determining, by the processor and using the seat bookings and the forecasted demand, a monetary dilution penalty of opening the closed class; and generating, by the processor, booking instructions based on the monetary stimulation value and the monetary dilution penalty.

14. The method of claim 1, further comprising:

accessing, by the processor, a bookings table, wherein the bookings table further contains information representing a net prime class seat booking for the flight, and wherein the net prime class seat booking occurred during a first time period;

determining, by the processor, a floor class for the net prime class seat booking in the bookings table;

determining, by the processor, a displacement class for a net prime class seat bookings in the bookings table;

determining, by the processor, a target class for the net prime class seat bookings in the bookings table, wherein the target class is the higher of the floor class and the displacement class; and remapping, by the processor, the net prime class seat bookings in the bookings table into the target class to form a remapped bookings table.

15. The method of claim 1, further comprising:

determining, by the processor, the fare classes in the plurality of fare classes for which demand is constrained in an unobscured bookings table;

calculating, by the processor, an unconstrained demand for each constrained fare class in the plurality of fare classes;

converting, by the processor, the unconstrained demand for each fare class into integer values representing the seat bookings in the respective fare classes;

updating, by the processor, the unobscured bookings table with the integer values to form an unconstrained bookings table;

generating, by the processor, an unconstrained demand forecast for the flight based on the unconstrained bookings table; and opening, by the processor, the additional fare class on the flight for the seat bookings, based on the unconstrained demand forecast.

16. The method of claim 15, wherein the determining the fare classes for which demand is constrained comprises identifying the fare classes that were opened for the seat bookings during a particular time interval.

17. The method of claim 15, further comprising weighting, by the processor, the unobscured demand for the fare class by a weighting parameter that is determined based at least partially on a departure date of the flight.

18. The method of claim 1, further comprising:

receiving, by the processor, booking requests for the seat bookings in the additional fare class on the flight; and issuing, by the processor, tickets for the seat bookings that provide access to the flight and access to seats associated with the seat bookings.

19. The method of claim 1, further comprising:

determining, by the processor using an unconstraining module, an unconstrained and unobscured demand, based on the unobscured demand;

opening, by the processor, an additional fare class on the flight for seat bookings, based on the unconstrained demand forecast;

quantifying, by the processor using a fare adjustment module, an impact of the opening of the additional fare class;

revising, by the processor using the fare adjustment module, the additional fare class;

receiving, by the processor interfacing with the revenue management system, the impact and the revising of the additional fare class;

revising, by the processor interfacing with the revenue management system, fare class seat prices based on the impact and the revising of the additional fare class; and revising, by the processor interfacing with the passenger revenue optimization system, a demand forecast based on the impact and the revising of the additional fare class.

* * * * *